US008370269B2

(12) United States Patent  
MacDonald-Korth et al.

(10) Patent No.: US 8,370,269 B2
(45) Date of Patent: Feb. 5, 2013

(54) SYSTEM AND METHODS FOR ELECTRONIC COMMERCE USING PERSONAL AND BUSINESS NETWORKS

(75) Inventors: Holly C. MacDonald-Korth, Salt Lake City, UT (US); Samuel Jacob Peterson, Orem, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 2070 days.

(21) Appl. No.: 10/894,813

(22) Filed: Jul. 20, 2004

(65) Prior Publication Data

US 2005/0273378 A1  Dec. 8, 2005

Related U.S. Application Data

(60) Provisional application No. 60/576,352, filed on Jun. 2, 2004.

(51) Int. Cl.
*G06Q 99/00* (2006.01)

(52) U.S. Cl. ........................................................ 705/319
(58) Field of Classification Search .................... 705/319
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |

(Continued)

FOREIGN PATENT DOCUMENTS

| | | |
|---|---|---|
| CA | 2253543 | 10/1997 |
| CA | 2347812 | 5/2000 |

(Continued)

OTHER PUBLICATIONS

"RepCheck.com—Because Reputation is Everything". RepCheck. retrieved from <http://repcheck.com>. archived Mar. 30, 2002.*

(Continued)

*Primary Examiner* — Peter Choi
(74) *Attorney, Agent, or Firm* — Clayton, Howarth & Cannon, P.C.

(57) ABSTRACT

Electronic commerce over a publicly accessible computer network such as the Internet is facilitated and leveraged by a computer system that forms a community of computer user parties based on personal and business connections of the parties involved. Personal connections are created between users by invitation and mutual acceptance. Business connections are created between users when a transaction takes place between those users. Users search to perform any one or more of a variety of actions such as to purchase products, browse departments and categories for purchasing products, or explore the connections between the parties involved to find items to buy. Different groupings of the parties involved may be the users themselves and other buyers/sellers in the business network, the users themselves and their friends in the personal networks, or some combination of buyers/sellers and friends from each of the types of networks. A computer or server at a site in the network implements an architecture whereby various pages viewed by a user have links to enable them to find products.

40 Claims, 15 Drawing Sheets

U.S. PATENT DOCUMENTS

| | | |
|---|---|---|
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,523,037 B1 | 2/2003 | Monahan et al. |
| 6,601,061 B1 | 7/2003 | Holt et al. |
| 6,604,107 B1 | 8/2003 | Wang |
| 6,643,696 B2 | 11/2003 | Davis et al. |
| 6,661,431 B1 | 12/2003 | Stuart et al. |
| 6,665,838 B1 | 12/2003 | Brown et al. |
| 6,701,310 B1 | 3/2004 | Sugiura et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 * | 2/2005 | Hurwitz ..................... 705/10 |
| 6,889,054 B2 | 5/2005 | Himmel et al. |
| 7,069,242 B1 * | 6/2006 | Sheth et al. ............... 705/37 |
| 7,076,453 B2 | 7/2006 | Jammes et al. |
| 7,100,111 B2 | 8/2006 | McElfresh et al. |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 * | 1/2007 | Farnham et al. ............ 709/223 |
| 7,216,115 B1 | 5/2007 | Walters et al. |
| 7,318,037 B2 * | 1/2008 | Solari ........................ 705/1.1 |
| 7,340,249 B2 | 3/2008 | Moran et al. |
| 7,349,668 B2 | 3/2008 | Ilan et al. |
| 7,380,217 B2 * | 5/2008 | Gvelesiani ................. 715/804 |
| 7,454,464 B2 * | 11/2008 | Puthenkulam et al. ....... 709/204 |

| | | | |
|---|---|---|---|
| 7,496,582 B2 * | 2/2009 | Farnham et al. | 707/100 |
| 7,653,573 B2 | 1/2010 | Hayes, Jr. et al. | |
| 2001/0034667 A1 | 10/2001 | Petersen | |
| 2001/0034668 A1 | 10/2001 | Whitworth | |
| 2001/0044751 A1 | 11/2001 | Pugliese et al. | |
| 2001/0047290 A1 * | 11/2001 | Petras et al. | 705/10 |
| 2001/0051996 A1 | 12/2001 | Cooper et al. | |
| 2002/0002513 A1 | 1/2002 | Chiasson | |
| 2002/0022995 A1 | 2/2002 | Miller et al. | |
| 2002/0023059 A1 | 2/2002 | Bari et al. | |
| 2002/0026390 A1 | 2/2002 | Ulenas et al. | |
| 2002/0029187 A1 | 3/2002 | Meehan et al. | |
| 2002/0042738 A1 | 4/2002 | Srinivasan et al. | |
| 2002/0099602 A1 | 7/2002 | Moskowitz et al. | |
| 2002/0107718 A1 | 8/2002 | Morrill et al. | |
| 2002/0129282 A1 | 9/2002 | Hopkins | |
| 2002/0147625 A1 * | 10/2002 | Kolke, Jr. | 705/9 |
| 2002/0147710 A1 * | 10/2002 | Hu | 707/3 |
| 2002/0161648 A1 | 10/2002 | Mason et al. | |
| 2002/0198784 A1 | 12/2002 | Shaak et al. | |
| 2003/0004855 A1 | 1/2003 | Dutta et al. | |
| 2003/0005046 A1 | 1/2003 | Kavanagh et al. | |
| 2003/0009392 A1 | 1/2003 | Perkowski | |
| 2003/0036914 A1 | 2/2003 | Fitzpatrick et al. | |
| 2003/0041008 A1 | 2/2003 | Grey et al. | |
| 2003/0046149 A1 | 3/2003 | Wong | |
| 2003/0069740 A1 | 4/2003 | Zeidman | |
| 2003/0088511 A1 | 5/2003 | Karboulonis et al. | |
| 2003/0093331 A1 | 5/2003 | Childs et al. | |
| 2003/0110100 A1 | 6/2003 | Wirth, Jr. | |
| 2003/0131095 A1 | 7/2003 | Kumhyr et al. | |
| 2003/0139969 A1 | 7/2003 | Scroggie et al. | |
| 2003/0158792 A1 | 8/2003 | Perkowski | |
| 2003/0163340 A1 | 8/2003 | Fitzpatrick et al. | |
| 2003/0167213 A1 | 9/2003 | Jammes et al. | |
| 2003/0200156 A1 * | 10/2003 | Roseman et al. | 705/27 |
| 2003/0204449 A1 * | 10/2003 | Kotas et al. | 705/27 |
| 2003/0217002 A1 | 11/2003 | Enborg | |
| 2004/0006509 A1 | 1/2004 | Mannik et al. | |
| 2004/0015416 A1 | 1/2004 | Foster et al. | |
| 2004/0055017 A1 | 3/2004 | Delpuch et al. | |
| 2004/0078388 A1 | 4/2004 | Melman | |
| 2004/0122681 A1 * | 6/2004 | Ruvolo et al. | 705/1 |
| 2004/0122803 A1 * | 6/2004 | Dom et al. | 707/3 |
| 2004/0122855 A1 * | 6/2004 | Ruvolo et al. | 707/104.1 |
| 2004/0128320 A1 | 7/2004 | Grove et al. | |
| 2004/0172379 A1 | 9/2004 | Mott et al. | |
| 2004/0174979 A1 | 9/2004 | Hutton et al. | |
| 2004/0204991 A1 | 10/2004 | Monahan et al. | |
| 2004/0249727 A1 | 12/2004 | Cook, Jr. et al. | |
| 2005/0021666 A1 | 1/2005 | Dinnage et al. | |
| 2005/0038733 A1 | 2/2005 | Foster et al. | |
| 2005/0044254 A1 | 2/2005 | Smith | |
| 2005/0060664 A1 | 3/2005 | Rogers | |
| 2005/0097204 A1 | 5/2005 | Horowitz et al. | |
| 2005/0131837 A1 | 6/2005 | Sanctis et al. | |
| 2005/0177385 A1 * | 8/2005 | Hull et al. | 705/1 |
| 2005/0197846 A1 * | 9/2005 | Pezaris et al. | 705/1 |
| 2005/0203888 A1 | 9/2005 | Woosley et al. | |
| 2005/0216300 A1 * | 9/2005 | Appelman et al. | 705/1 |
| 2006/0009994 A1 * | 1/2006 | Hogg et al. | 705/1 |
| 2006/0031240 A1 | 2/2006 | Eyal et al. | |
| 2006/0041638 A1 | 2/2006 | Whittaker et al. | |
| 2006/0058048 A1 | 3/2006 | Kapoor et al. | |
| 2006/0069623 A1 | 3/2006 | MacDonald Korth et al. | |
| 2006/0085251 A1 | 4/2006 | Greene | |
| 2006/0173817 A1 | 8/2006 | Chowdhury et al. | |
| 2006/0259360 A1 | 11/2006 | Flinn et al. | |
| 2007/0073641 A1 | 3/2007 | Perry et al. | |
| 2007/0078726 A1 | 4/2007 | MacDonald Korth et al. | |
| 2007/0245013 A1 | 10/2007 | Saraswathy et al. | |

FOREIGN PATENT DOCUMENTS

| | | |
|---|---|---|
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |

OTHER PUBLICATIONS

Yu, Bin; Singh, Munindar. "Distributed Reputation Management for Electronic Commerce". 2002. Computational Intelligence. vol. 18. pp. 535-549.*

Resnick, Paul; Zeckhauser, Richard; Friedman, Eric; Kuwabara, Ko. "Reputation Systems". Dec. 2000. Communications of the ACM. vol. 43, No. 12. pp. 45-48.* http://www.friendster.com/index.jsp, http://friendster.com/info/tour.jsp, http://www.friendster.com/info/moreinfo.jsp (pp. 1-2), Friendster Beta.

Karl Zetmeir, Auction Incentive Marketing, Overland Park, KS 66213; website: http://home.earthlink.net/~bidpointz/id11.html; Site Categories: Home; How It Works!; Who Benefits?; Bid History; Graphics/Contact Information; BiogZ; Total pages attached: 20.

Website: http://www.buy.com; Copyright 1997-2004, Buy.com Inc.; Powered by BuyServices Inc., Total pages attached: 3.

Website: http://www.Metails.com; A Buy.com Company; 2003-2004 Metails Incorporated; Total pages attached: 8.

"ONSALE joins fray as online shopping picks up speed: Internet Booms," Computer Reseller News, Jun. 5, 1995.

PALM, Inc., Palm™ Web Pro Handbook, copyright 2002-2003.

Post et al., "Application of Auctions as a Pricing Mechanism for the Interchange of Electric Power," IEEE Transactions on Power Systems, Aug. 1995, pp. 1580-1584, vol. 10, No. 3.

Preist et al., "Adaptive agents in a persistent shout double auction," International Conference on Information and Computation, Proceedings of the first international conference on information and computation economies, Oct. 25-28, 1998, Charleston, United States, pp. 11-18.

Qualcomm, "Brew Developer Support," printed from web.archive.org/web/20020209194207/http://www.qualcomm.com/brew/developer/support/kb/52.html on Aug. 30, 2007.

RCR Wireless News, "Lockheed Martin to use 2Roam's technology for wireless platform," RCR Wireless News, Sep. 10, 2001.

Reck, "Formally Specifying an Automated Trade Execution System," J. Systems Software, 1993, pp. 245-252, vol. 21.

Reck, "Trading-Process Characteristics of Electronic Auctions," Electronic Markets—The International Journal, Dec. 1997, pp. 17-23, vol. 7, No. 4.

Rockoff et al., "Design of an Internet-based systems for remote Dutch auctions," Internet Research: Electronic Networking Applications and Policy, 1995, pp. 10-16, vol. 5, No. 4.

Rose, "Vendors strive to undo Adobe lock-hold," Computer Reseller News, Feb. 5, 1996, n6669, p71(7).

Rysavy, "Mobile-commerce ASPs do the legwork," Network Computing, Jan. 22, 2001, p. 71, 6 pgs., vol. 12, No. 2.

Saunders, "AdFlight to Offer WAP Ads," Oct. 17, 2000, printed from clickz.com/487531/print.

Schmid, "Electronic Markets," Electronic Markets—The International Journal, Oct. 1993, 2 pages, vol. 3, No. 3.

Schwankert, "Matsushita Taps 2Roam for Wireless Solutions," www.internetnews.com/bus-news.article.php/674811, Feb. 2, 2001.

Siegmann, "Nowhere to go but up," PC Week, Oct. 23, 1995, 3 pages, vol. 12, No. 42.

Telephony Staff, "Air-ASP," Telephony Online, Oct. 2, 2000, 3 pages.

Teo, "Organizational Factors of Success in Using EDIS: A Survey of Tradenet Participants," Electronic Markets—The International Journal, Oct. 1993, 2 pages, vol. 3, No. 3.

Tjostheim et al., "A case study of an on-line auction for the World Wide Web," printed from www.nr.no/gem/elcom/publikasjoner/enter98e.html on Jun. 10, 1999, 10 pages.

Turban, "Auctions and Bidding on the Internet: An Assessment," Electronic Markets—The International Journal, Dec. 1997, 5 pages, vol. 7, No. 4.

Ubid.Com, "How do I Update my Address, Phone, Credit Card, Password, etc.?" printed from web.archive.org/web/20010208113903/www.ubid.com/help/topic13.asp on Aug. 30, 2007.

Ubid.Com, "How do I track my shipment?" printed from web.archive.org/web/20010331032659/www.ubid.com/help/topic27.asp on Aug. 30, 2007.

UBID.COM, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

XCHANGER.NET, webpage printed from www.auctiva.com/showcase/as_4sale.asp?uid=exchanger, undated but at least as early as Oct. 12, 2000.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," Internaitonal Journal of Electronic COmmerce, Fall 1996, pp. 3-23, vol. 1, No. 1.

2ROAM, INC., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

Anonymous, Image manipulation (image-editing software and image-manipulation systems) (Sybold Special Report, Part II), Seybold Report on Publishing Systems, May 15, 1995, p. S35(9), vol. 24, No. 18.

AUCTIONWATCH.COM, multiple pages—including search results for "expedition," printed Apr. 21, 2011.

AUCTIVE.COM, multiple page, undated but website copyright date is "1999-2000."

Braganza, "IS Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 1, No. 3.

Business Wire business editors/high-tech writers, "2Roam Partners With Pumatech to Deliver Wireless Alerts," Business Wire, Dec. 18, 2000.

Business Wire business editors/high-tech writers, "2Roam Takes eHow's How-to Solutions Wireless: With 2Roam, the Web's One-Stop Source for Gettnig Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company to Provide Customers Wireless Access From Any Device," Business Wire, Aug. 7, 2001.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A grid Applicaion :Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," Mis Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

IEEE 100—The Authoritative Dictionary of IEEE Standards Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.

Kuula, "Telematic Services in Finland," Electronic Markets—The International Journal, Oct. 1993, 1 page, vol. 3, No. 3.

Lalonde, "The EDI World Institute: An International Approach," Electronic Markets—The International Journal, Oct. 1993, 1 page, vol. 3, No. 3.

Lee et al., "Intelligent Electronic Trading for Commodity Exchanges," Electronic Markets—The International Journal, Oct. 1993, 2 pages, vol. 3, No. 3.

Lee et al., "Electronic Brokerage and Electronic Auction: The Impact of IT on Market Structures," Proceedings of the 29th Annual Hawaii International Conference on System Sciences, 1996, pp. 397-406.

Lee, "AUCNET: Electronic Intermediary for Used-Car Transactions," Electronic Markets—The International Journal, Dec. 1997, pp. 24-28, vol. 7, No. 4.

LIVE365 press release, "Live365 to Offer Opt-In Advertising on Its Website," Oct. 15, 2004.

London Business School, "Overture and Google: Internet Pay-Per-Click (PPC) Advertising Options," Mar. 2003.

M2 PRESSWIRE, "Palm, Inc.: Palm unveils new web browser optimised for handhelds; HTML browser offers high-speed web-browsing option," Mar. 13, 2002.

Malone et al., "Electronic Markets and Electronic Hierarchies," Communications of the ACM, Jun. 1987, pp. 484-497, vol. 30, No. 6.

Mansell et al., "Electronic Trading Networks: The Route to Competitive Advantage?" Electronic Markets—The International Journal, Oct. 1993, 1 page, vol. 3, No. 3.

Mardesich, "Onsale takes auction gavel electronic," Computer Reseller News, Jul. 8, 1996, pp. 2, 32.

Marteau, "Shop with One Click, Anywhere, Anytime," Information Management and Consulting, 2000, pp. 44-46, vol. 15, No. 4.

Massimb et al., "Electronic Trading, Market Structure and Liquidity," Financial Analysts Journal, Jan.-Feb. 1994, pp. 39-49.

McGinity, "Build Your Weapon," PC Magazine, Apr. 24, 2011, printed from www.pcmag.com/print_article2?0,1217,a%253D3955,00.asp.

Meade, "Visual 360: a performance appraisal system that's 'fun,'" HR Magazine, 44, 7, 118(3), Jul. 1999.

"Mediappraise: Mediappraise Receives National Award for Web-based Technology That Enables Companies to Solve Thorny HR Problem," Dec. 14, 1998.

Medvinsky et al., "Electronic Currency for the Internet," Electronic Markets—The International Journal, Oct. 1993, 2 pages, vol. 3, No. 3.

Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.

O'Mahony, "An X.500-based Product Catalogue," Electronic Markets—The International Journal, Oct. 1993, 2 pages, vol. 3, No. 3.
"ONSALE: ONSALE Brings Thrill of Auctions and Bargain Hunting Online: Unique Internet retail service debuts with week-long charity auction for the Computer Museum in Boston," May 24, 1995, printed from www.dialogweb.com/cgi/dwclient?dwcommand_DWEBPRINT%20810-489267.

* cited by examiner

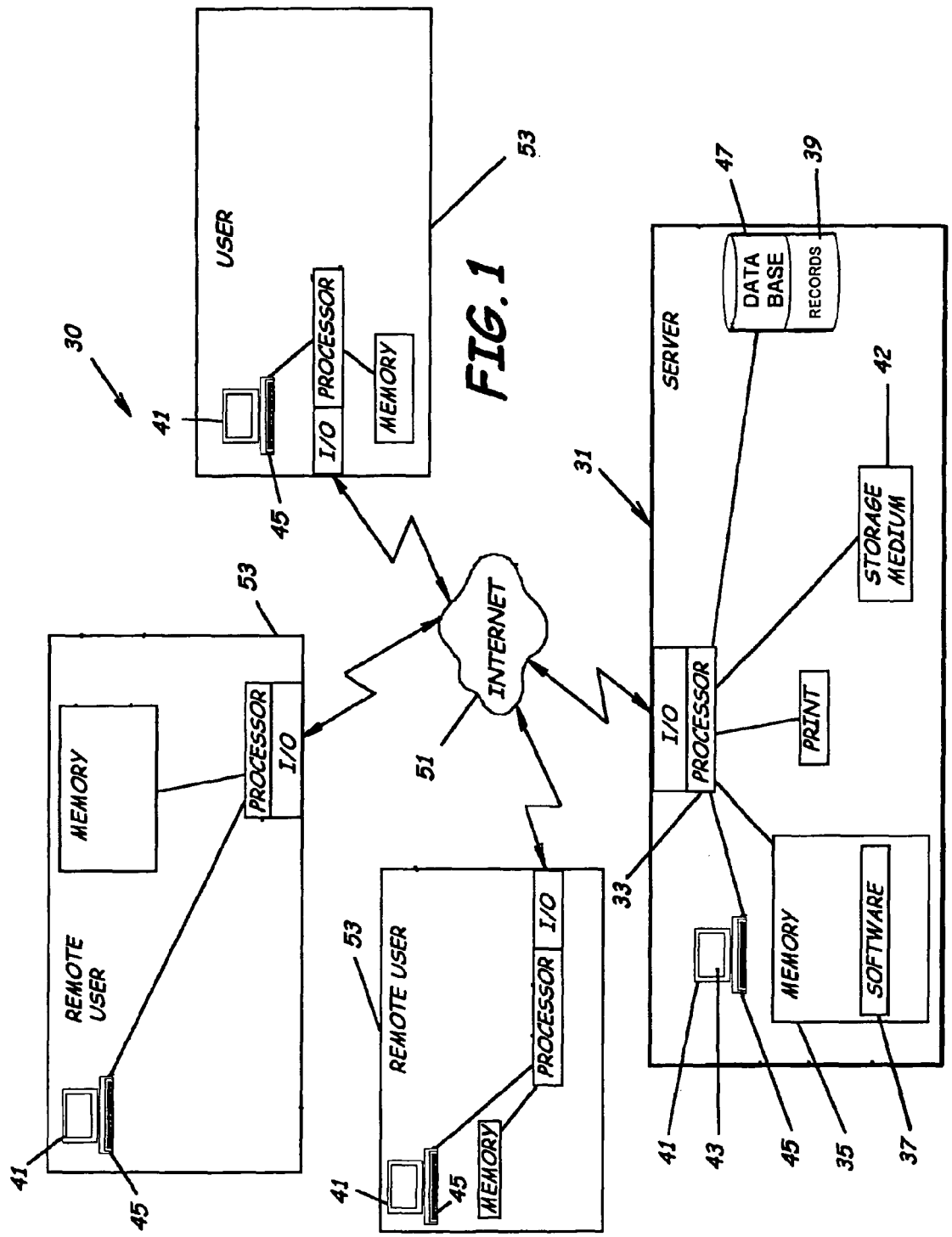

SYSTEM AND METHODS FOR ELECTRONIC COMMERCE USING PERSONAL AND BUSINESS NETWORKS

This application claims the benefit of U.S. Provisional Patent Application Ser. No. 60/576,352 filed Jun. 2, 2004.

BACKGROUND OF THE INVENTION

1. Technical Field

The present invention relates in general to electronic commerce and, in particular, to networks for facilitating electronic commerce. Still more particularly, the present invention is directed to systems, software, and methods for Internet commerce that is facilitated and leveraged by the personal and business connections of the parties involved, and allowing users to explore the connections among themselves and other buyers and sellers, and rating the performance of such transactions.

2. Description of the Related Art

Commercial transactions conducted through electronic communication (e.g., via the World Wide Web (the Web)), commonly known as "e-commerce", are a significant segment of the global economy. In a typical e-commerce transaction, a desktop or laptop computer user decides upon a good or service that the user is interested in purchasing. The user then initiates access to a retailer's or service provider's e-commerce website via the Web, perhaps after conducting a search for the website with a commercial search engine.

After the desired e-commerce website is located, the user searches the website for the desired good or service, either by conducting a search of the website or by paging through the website content. The user may then add the desired product or service to a virtual "shopping cart" that collects the user's intended purchases by selecting a graphical "button" associated with a graphical or textual description of the good or service. After the user indicates that all intended purchases have been added to the virtual "shopping cart," the e-commerce website presents to the user a form into which the user enters and transmits payment information (e.g., credit card information). Once the payment information is approved, the website presents to the user a confirmation that transaction is complete and may indicate a delivery schedule or methodology.

There have been many attempts to join buyers and sellers, and to provide information about them to each other for purposes of enhancing e-commerce. For example, some websites provide an enhanced user rating service for online business transactions. Buyers and sellers rate other buyers and sellers with whom they do business, and provide prospective users with information they can use when deciding when to do business with another user. Objective criteria, such as credit information, is combined with subjective ratings to create a user profile. Objective criteria is also used to supplement user ratings to treat new users more fairly and prevent participants from engaging in collusion to inflate their ratings. The user profile may be shared among online services, so that a user's aggregate transaction and ratings history may be utilized at a number of websites.

Some websites provide friendship networking that allows users to meet new people, to date through friends and their friends, make new friends, and help friends meet new people. After the creation of a user profile, they enhance the formation of a personal and private community where people interact to view photos, profiles, connections to other people, send messages, ask for introductions, or suggest matches between people.

Another system provides product recommendations over an e-commerce network based on customer user browsing or purchasing behavior. The system derives product characterizations for products offered at an e-commerce site based on text descriptions of the products provided at the site. A customer characterization is generated for any customer browsing the e-commerce site. The customer characterizations include aggregation of derived product characterizations associated with products bought and/or browsed by that customer. A peer group is formed by clustering customers having similar customer characterizations. Recommendations are then made to a customer based on the processed characterization and peer group data.

Yet another website includes searching a database for data on previous sales of similar items at online commerce websites. Using this data, the seller gets a recommendation about the best way to sell the item. If data about similar items are not available in the database, the method allows the seller to start an agent program that will search various sites for the data over a period of time.

Still another system provides samples to users in exchange for feedback that is provided to subsequent users considering purchasing the product. Products available for purchase from an e-commerce site are provided for a sampling program to users. A predetermined number of users are allowed to sample the product. Feedback from the users is solicited and tracked to provide additional information to the seller and/or potential customers. In addition, some websites register, store, and manage a user's unique authentication credentials, such as user names, passwords, and other personal information, over a network, and for allowing users to link to and log onto other websites using the authentication credentials.

Although each of these solutions has some usefulness, their shortcomings collectively represent significant impediments to the conduct of e-commerce, which are addressed and overcome by the present invention.

SUMMARY OF THE INVENTION

One embodiment of the present invention relates to a system and methods for electronic commerce using personal and/or business networks to create a community of interconnected sellers, such as for rating or the performance of other product and/or service (hereinafter, "products") sellers. Embodiments of the present invention also include a computer readable medium containing a set of instructions or program causing the computer system to facilitate according to the present invention, and a database of personal networks and business networks formed by users of the computer system. For example, in an embodiment of the present invention, an auction or other e-commerce website allows registrants of the site to "invite" others to join their "personal network" or "business network" to leverage the personal and business connections of the parties involved. The invitees, if not already registered, can come to the auction or other e-commerce website and create an account or register. An invitee, whether having newly created an account or having a preexisting account, then receives a confirmation of their association with the inviter.

Once the site receives the confirmation, both registrants are members of one another's personal network or business network. Members of a registrant's network rate those in their personal or business networks and write personal reviews of them or their transaction. Users with whom a registrant communicates or transacts business also becomes part of that registrant's business network. Such communications or transactions include buying from one another, selling to one another, and other types of business transactions.

In addition, users can perform keyword searches of the site or browse taxonomy to find products in which the users are interested in viewing or buying, as in traditional Internet auction or other e-commerce model. Then, from a product page, users can browse a registrant's personal and business network. If the user is registered and logged in, the user/registrant can choose to see the degrees of separation between themselves and the registrant selling the items. This shows them through whom they are connected to the selected registrant.

Selecting a node of a registrant's personal or business network displays their personal ratings and performance ratings, their corresponding personal or business network, and links to items that registrant is selling. In this way, a user can browse through networks of interconnected users to explore, for example, performance history, reputation, personality, and product offerings. This embodiment of the invention allows users to search for items at an auction-type or other type of e-commerce site in the classic way, with keywords, as well as explore friends' and associates' networks to search for items. This can be implemented on any consumer-to-consumer, business-to-business, or business-to-consumer Internet site.

As an illustration, if User A is attempting to purchase products or services from User C, User A is able to view how he or she is connected to User C. If Users A and C have performed a business transaction with User B, then Users A and C can see that User B connects them together. Users A and C can see how the other's transactions with User B were rated. Users A and C also can contact User B with questions about past transactions or contact each other.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 1 is a high level block diagram of an illustrative e-commerce environment in which the present invention may be practiced;

DETAILED DESCRIPTION

Figure 2A:
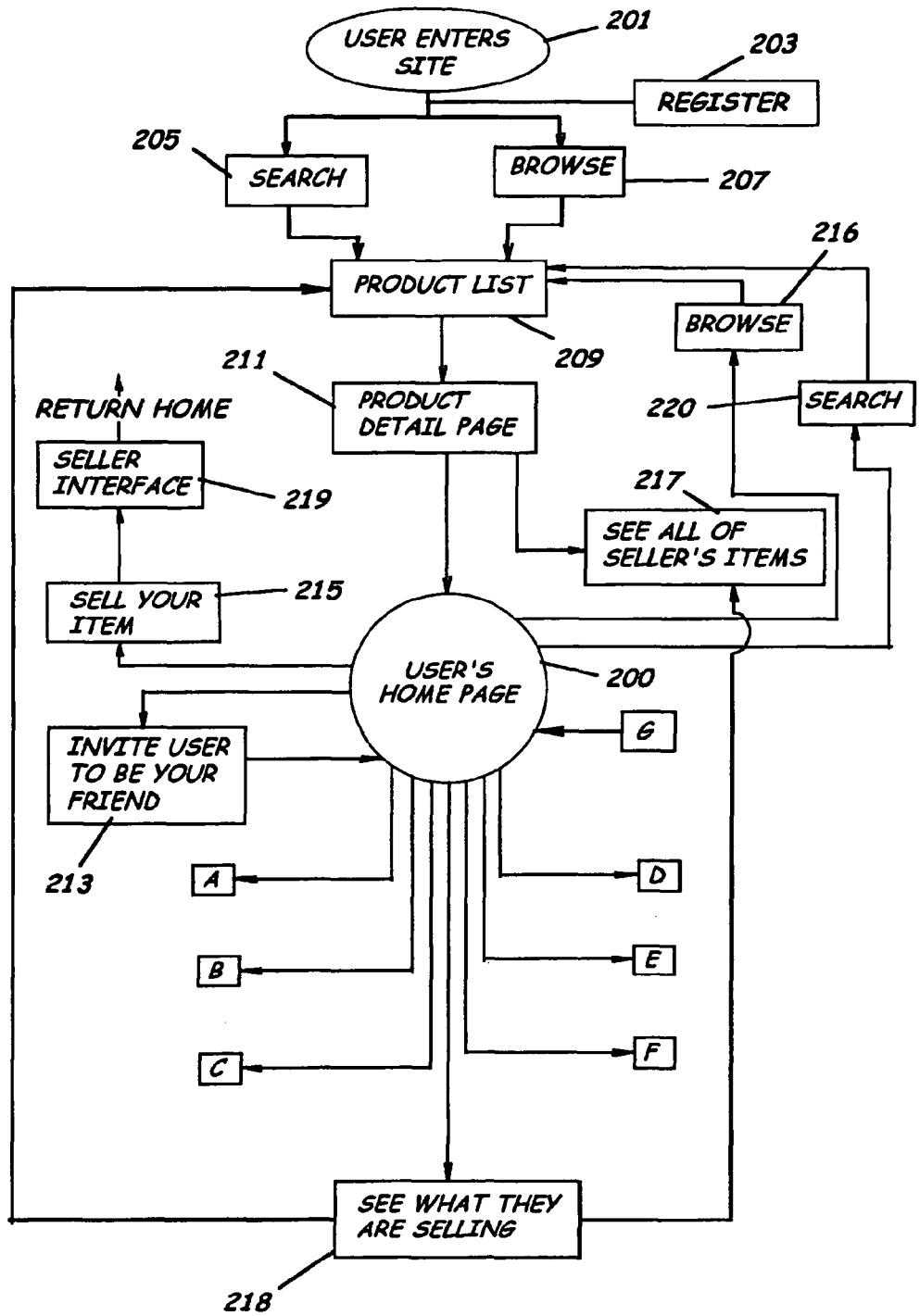
FIGS. 2A-2C are a high level logical flowchart of one embodiment of an overall, illustrative process constructed in accordance with the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

With reference now to the figures, and in particular with reference to FIG. 1, there is illustrated an exemplary e-commerce environment in accordance with the present invention. Embodiments of the present invention advantageously provide a system and methods for facilitating e-commerce on the Web. Embodiments of the present invention also include a computer readable medium containing a set of instructions or program causing the computer system to facilitate according to the present invention, and a database of personal networks and business networks formed by users of the computer system.

The system 30 includes a computer system positioned at a site to define a server or server module 31. In one embodiment, the server 31 is actually a module having two separate types of machines, in order to provide processing/server capability for two functionalities. One of these functionalities is that of web/application processing, and the other is that of database processing. The web/application requirements functionality of the server 31 is furnished by a web/application server. Suitable units for this purpose are in the form of an appropriate number of Dell 1750 servers with dual CPUs, 1 GB RAM, and mirrored hard drives. The web/application servers are connected to a database server or server cluster which provides the database functionality. Database servers suitable for this purpose are, for example, Dell 2650 servers with dual CPU and 10 GB RAM. The database servers of server module 31 are attached to a high performance storage device, as will be described.

The set of instructions 37 also causes the processor to form and forward for retention and further use a set of database records 39. A graphical display 41 is coupled to the processor 33 for displaying graphical images 43, and a user interface 45 coupled to the processor 33 to provide a user access to manipulate the software 37 and database records 39. An embodiment of the present invention also advantageously provides software stored on storage media 42.

It should be understood that the preferred specific server identified above is given by way of example and that other types of servers or computers may be used. The server shown schematically at 31 represents a server or server cluster or server farm in the architecture and is not limited to any individual physical server. The server site may be deployed as a server farm or server cluster managed by a serving hosting provider. The number of servers and their architecture and configuration may be increased based on usage, demand and capacity requirements for the system 30.

The system 30 further includes in database 47 or a set or grouping of databases stored in the memory of the server 31 or in other suitable data storage media accessible to the server 31. The database 47 may also be provided in the form of a database server or server cluster. The particular database configuration is replicated based on capacity requirements for the system 30. The database 47 or databases further include at least a plurality of records 39 having data relating to the users and to the personal networks and business networks formed by users of the computer system. The system 30 further includes software 37 stored in memory 35 of the server 31 to process information within the system 30. The software 37 allows the server 31 to interface with users and generally allows the users to operate the computer system 30 according to the present invention for electronic commerce using personal and/or business networks to create a community of interconnected sellers, such as for rating or the performance of other product and/or service (hereinafter, "products") sellers. The software instructions 37 allow a user to inquire about data or information from database 37 or the system 30.

The software or set of instructions 37 according to the present invention may be stored in a machine-readable storage medium, such as, but not limited to, any type of computer data storage disk including floppy disks, CD-ROMs, optical disks, magneto-optical disks, read-only memories (or ROMs), EPROMs, EEPROMs, random access memories (RAMs), magnetic or optical cards, or other types of media suitable for storage of a set of instructions that, when executed by the server 31, cause the server to perform the operations of the present invention.

The program set of instructions described in the present invention are not inherently related to or required by a particular computer or other server hardware. Various conventional computers or servers may be used according to the present invention. In addition, the present invention is not described with reference to any particular programming language. It will be understood that a variety of programming languages may be used to implement the system and method of the present invention as described herein.

In an embodiment of the present invention, the system 30 interfaces the area network or Internet 51 by communicating through the server 31, and a plurality of remote user computers 53 in communication with the Internet 51, positioned remote from the server 31 at a user site, and positioned to access the server 31. The user computer 53 is typically a personal computer and may be connected over the Internet through a variety of configurations, such as through a stand-alone computer with individual access, or though a local area network (LAN) or wide area network (WAN). Access to the server 30 by the user computers may be made by a variety of communication links such optical cable, a wireless network such as a cellular network, satellite network or other access media.

When in communication with the server 31 through the Internet 51, the remote user computer 53 can access the software 37 for various purposes. The remote user computer 53 can retrieve records 39 from the server database 47 for display and user manipulation. The system 30 can also include still other devices 55, such as a portable computer, a PDA, a mobile telephone, and still other devices for accessing the Web, that are adapted to interface with the Internet 51 while positioned remote from the server 31.

Referring now to FIGS. 2-16, an embodiment of facilitating electronic commerce according to the present invention first comprises one or more users entering from a user computer 53, as depicted in FIG. 2A at step 201, a website such as that provided by server 31 of system 30. If one or more of the users are not registered with the website, they must first register (step 203). Registration permits the users to set up a home page 200 and join the communications network and be electronically interconnected as part of system 30 to define a community of users. One example of a web page (hereinafter, page) for registering users is illustrated in FIG. 14.

Registration involves entering a variety of personal information, such as contact information 2201, security information 2103, and preferences. As will be described in much greater detail below, registration also permits users to have their own personal networks and business networks. Users may set up an identifying profile with preferences that is unique to the users. For example, users have the ability to designate a number of parameters, such as:

"I am primarily"—to indicate whether the user is a buyer, a seller, a mix of both, or just browsing;

"Things I usually sell"—a free form text field allowing the user to identify such things;

"Things I like to buy"—a free form text field allowing the user to identify such things;

"Other interests"—a free form text field for the user to make general comments;

"My shipping policy"—to indicate and permit a user/seller option to select carriers; once selected, the appropriate shipping methods related to the carriers are displayed; and the user may then indicate the methods that are accepted for use;

"My payment policy"—to indicate and permit a seller to select from a list of common payment methods; and "My returns policy"—a free form text field for a user's statement of returns policy.

Image upload—in addition, users are provided with the capability by which they can upload images to represent their profile.

Figure 14:
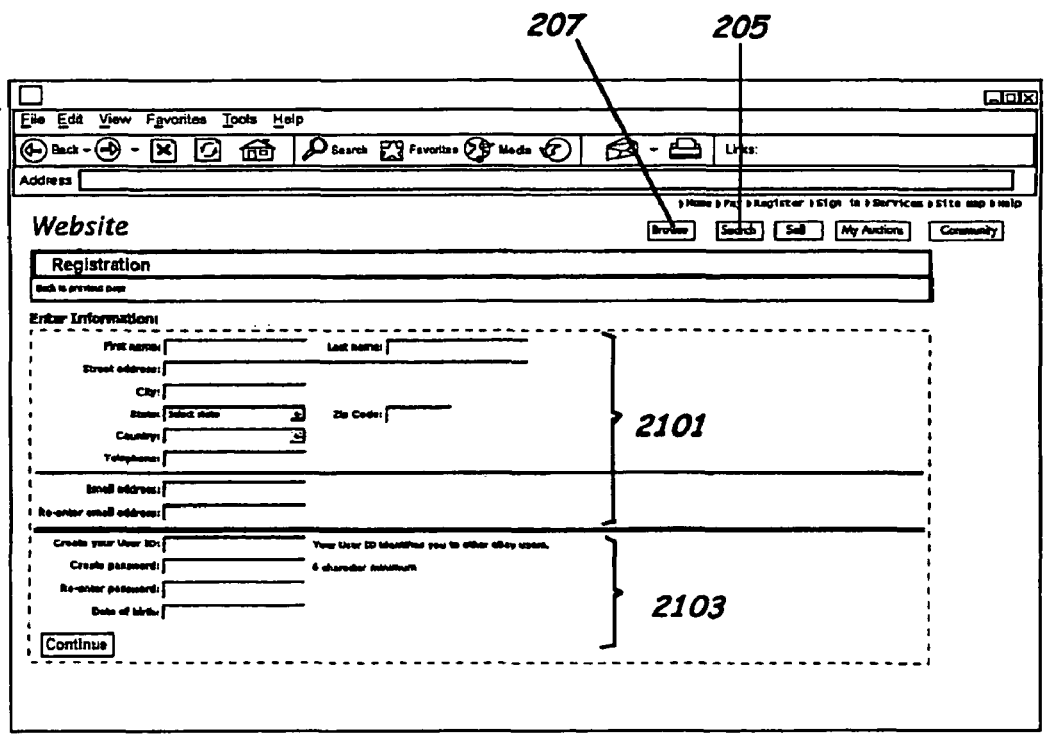
FIG. 14 is a schematic representation of a registration webpage and is constructed in accordance with the present invention.
Figure 15:
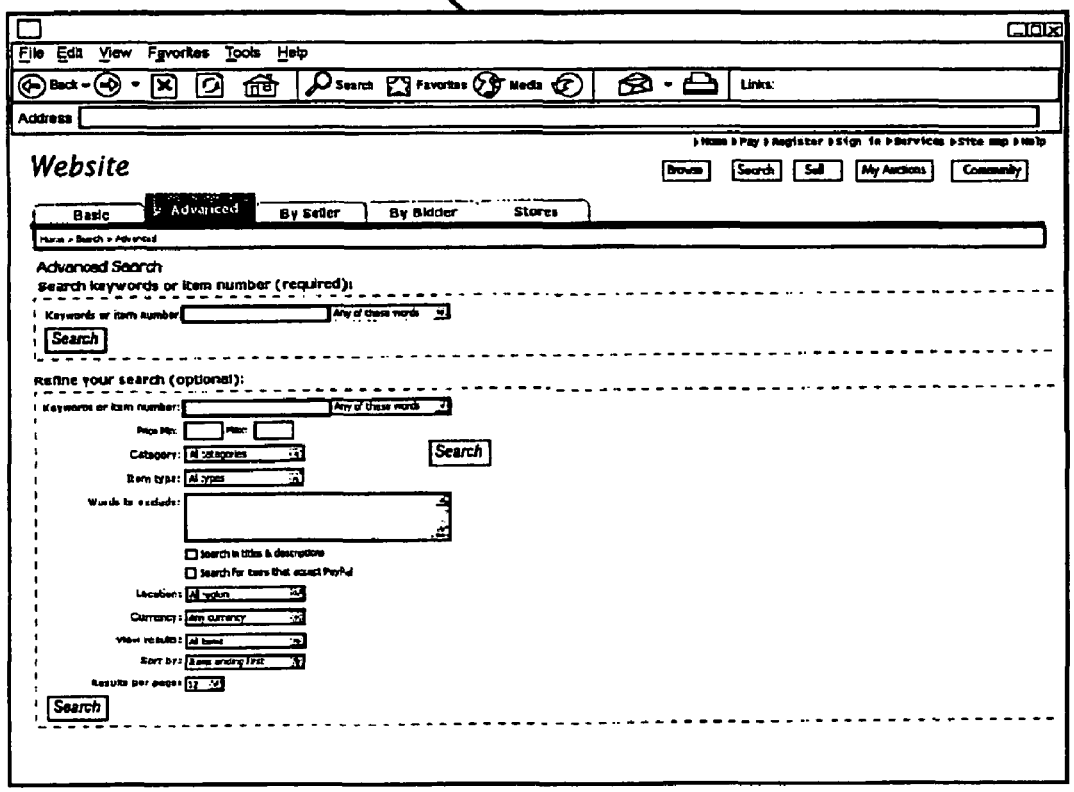
FIG. 15 is a schematic representation of a search webpage and is constructed in accordance with the present invention.
Figure 16:
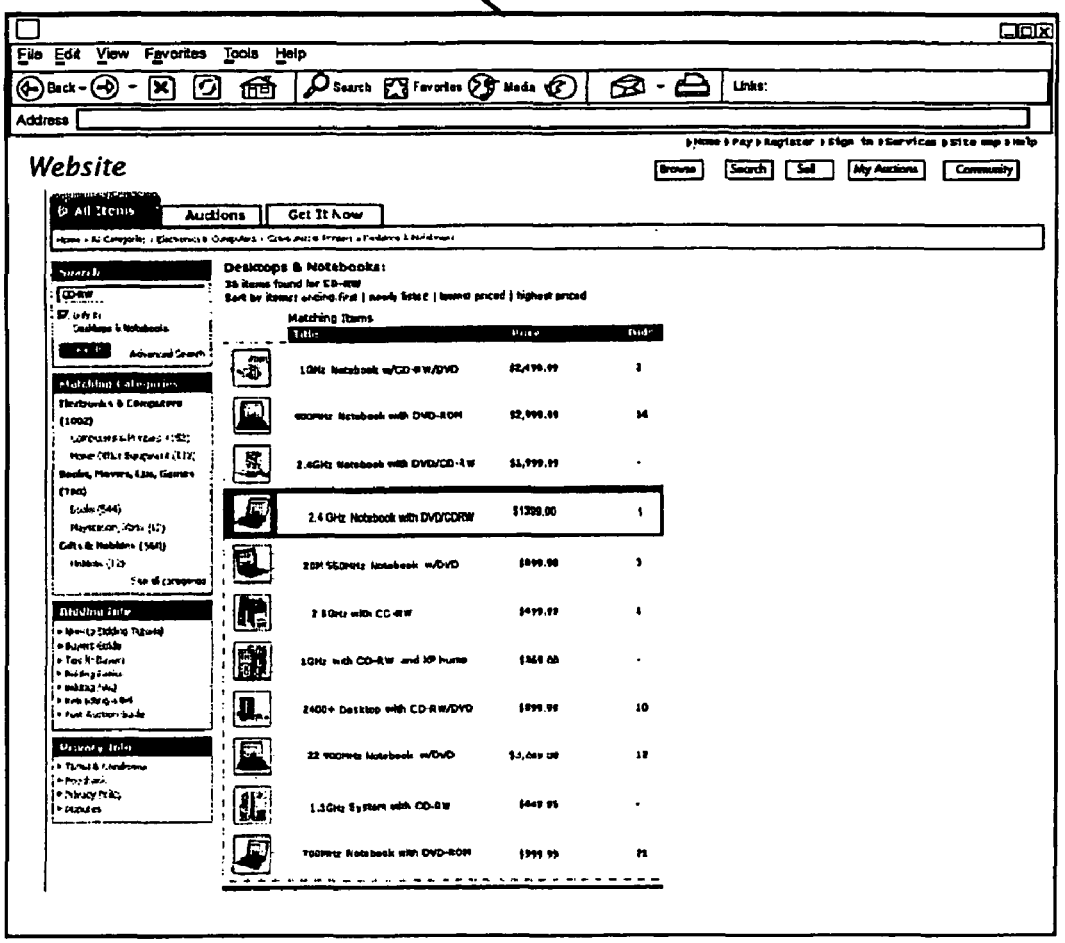
FIG. 16 is a schematic representation of a browse webpage and is constructed in accordance with the present invention.

As depicted at steps 205 and 207 (FIGS. 2A and 14-16), the method further comprises users performing, for example, keyword searches or browsing taxonomy, respectively, of other users' networks and data contained in database 47 within the community to locate products or services from a product list 209 from database 47 in which the users are interested in electronic commerce. A product detail page 211 from database 47 may be selected from the product list 209. Examples of pages presented at a user's display 41 for searching step 205 and browsing step 207 are illustrated in FIGS. 15 and 16.

Figure 3:
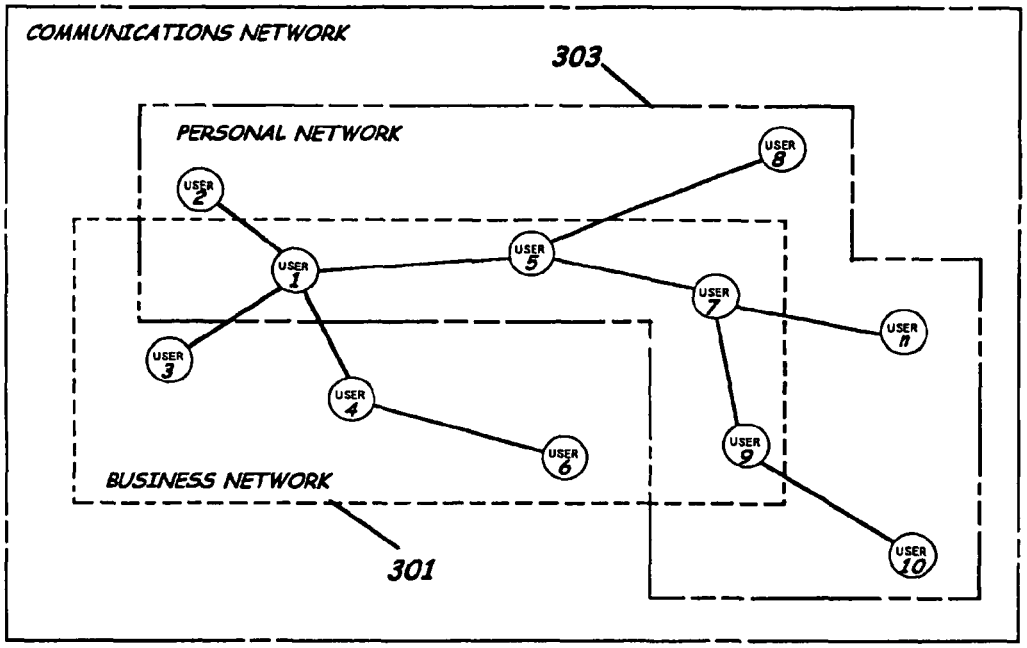
FIG. 3 is a schematic diagram of one embodiment of a user's personal and e-commerce business networks and is constructed in accordance with the present invention.
Figure 4:
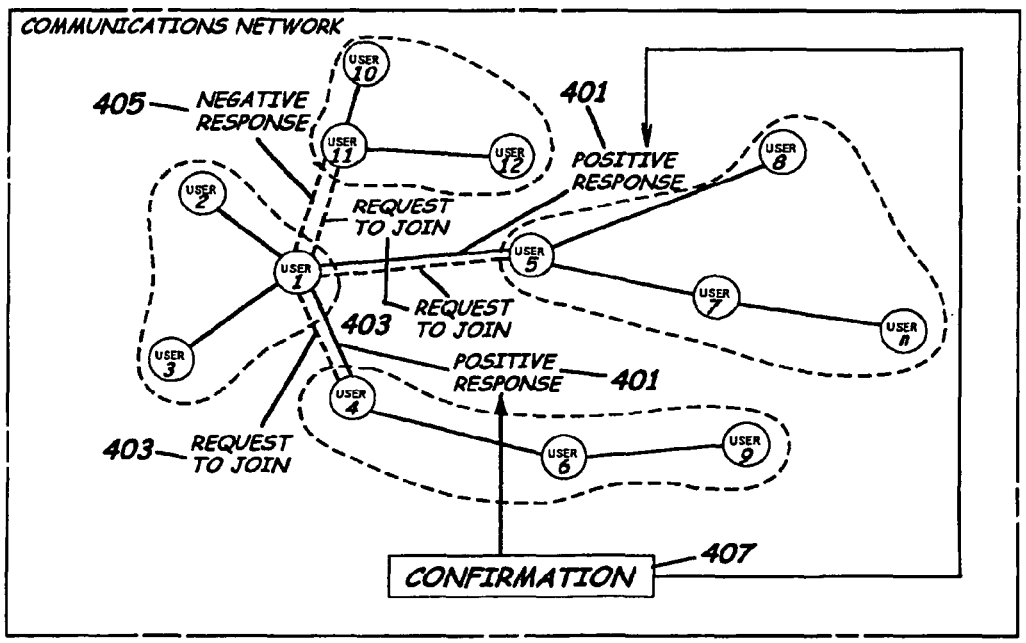
FIG. 4 is a schematic diagram of one embodiment of multiple users interconnections and is constructed in accordance with the present invention.
Figure 5:
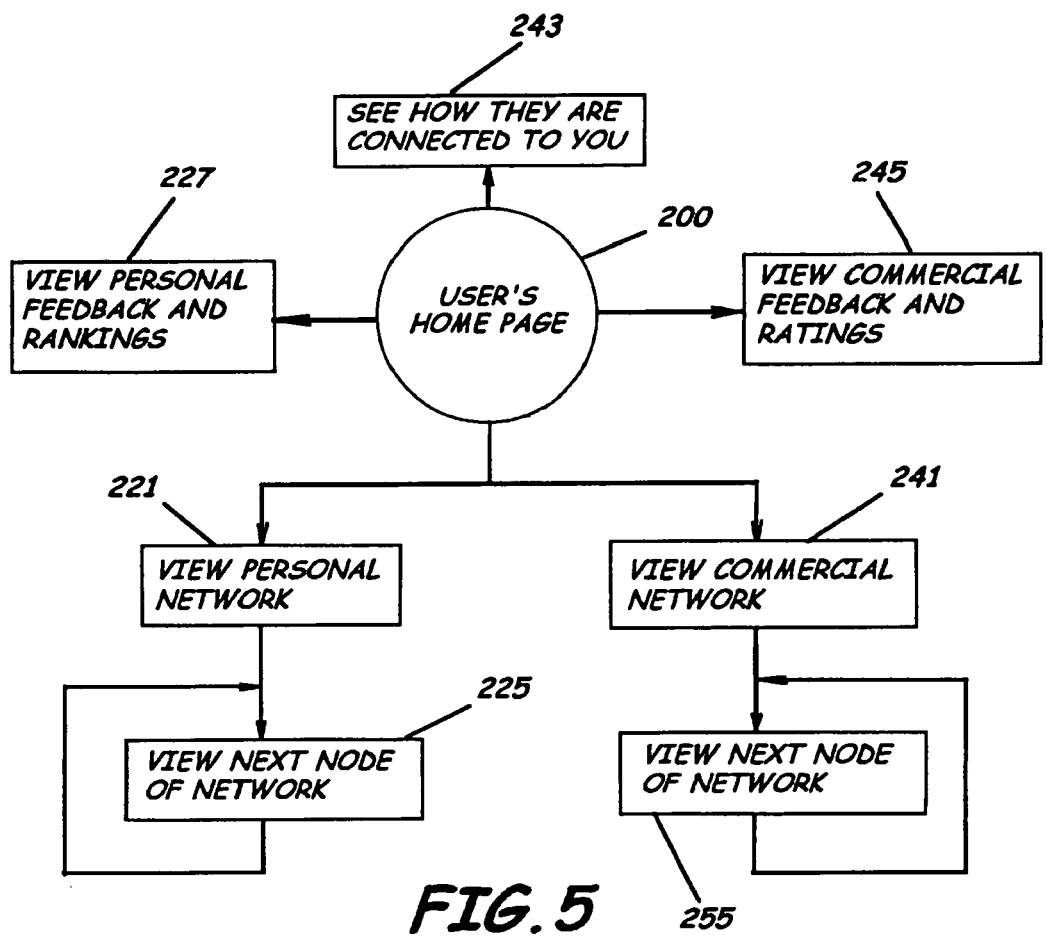
FIG. 5 is a high level logical flowchart of one embodiment of personal and business networks and is constructed in accordance with the present invention.

As shown schematically in FIGS. 3 and 4, users may establish networks of personal and business relationships. A business network shown schematically at 301 is a group of business relationships in the community of users that engage in electronic commerce. Electronic commerce comprises, for example, at least one or more of a number of electronic commerce transactions, such as buying goods, selling goods, buying services, or selling services. A personal network shown schematically at 303 is a group of personal relationships in the community of users that engage one another through personal, typically non-commercial electronic interaction with other users.

The personal network 303 may be separate from the business network 301, or there may be overlap between the two such that at least one other user is in both networks 301, 303, as shown in FIG. 3. In this context, the term "separate" may be interpreted as, for example: (a) no user is a member of both the business and personal networks of another user, or (b) the business and personal networks are individually maintained as unique entities of a user, but the user may allow at least one other user to be in both of his or her networks as shown in FIG. 3.

In one embodiment, a page (FIG. 8) for the business network 301 of each registered user displays at least one or more of his or her business relationships with other people. This page displays thumbnail images and profile names of at least one or more of the people that a user has either sold to, purchased from, or both, as shown at step 241 in FIG. 2C. Inquiring users may use links to go to other user's home page at step 253, or view the next node of the displayed network during step 255.

Figure 9:
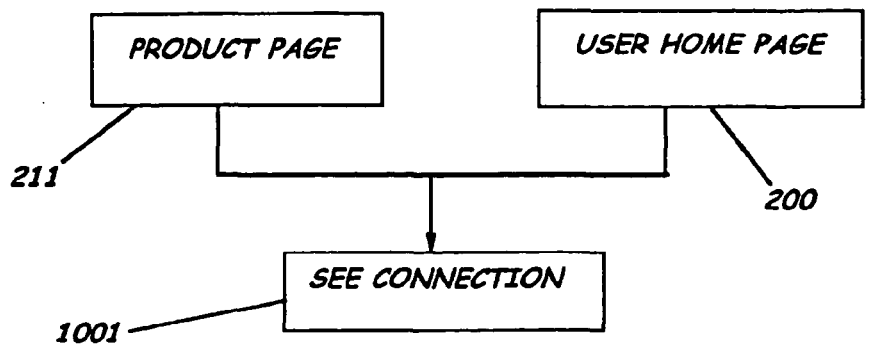
FIG. 9 is a high level logical flowchart of one embodiment of a process for summarizing a community of users in the personal and business e-commerce networks of FIGS. 5 and 6, and is constructed in accordance with the present invention.
Figure 10:
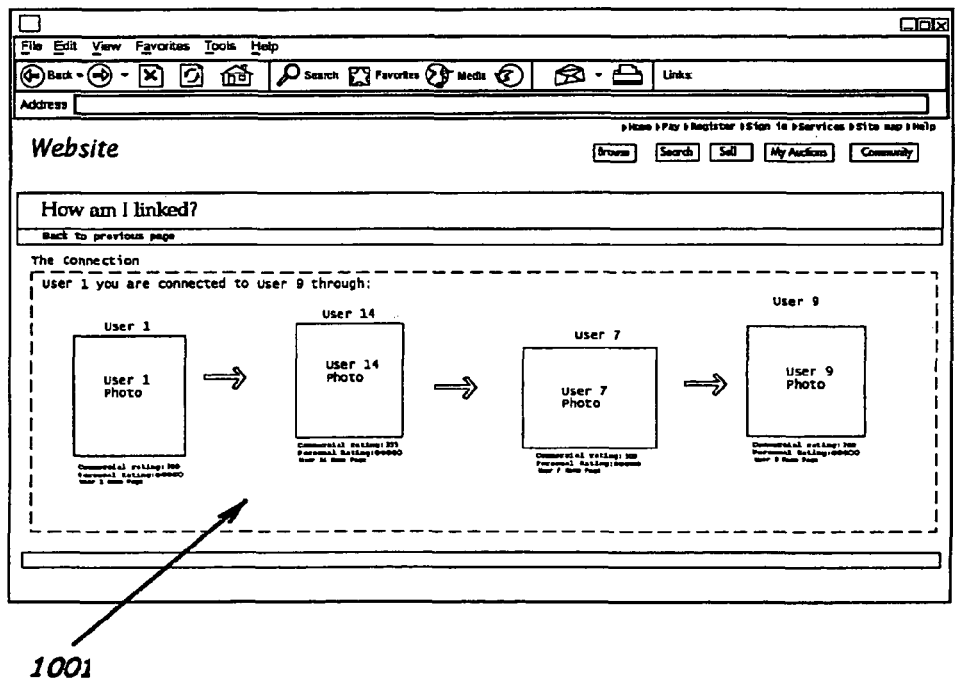
FIG. 10 is a schematic representation of a webpage for the summarizing process of FIG. 9, and is constructed in accordance with the present invention.

Additionally, the business network page may show how the business relationships are interconnected (step 243) to one another (see FIG. 10) through "degrees of separation" or connection 1001 between the users. As shown in FIG. 9, the computer system 30 automatically "solves" for the connection 1001 and graphically displays it to the inquiring user. Viewing step 243 (FIG. 2C) also permits users to inquire at step 247 about intermediate users or select other users at step 249.

Figure 2B:
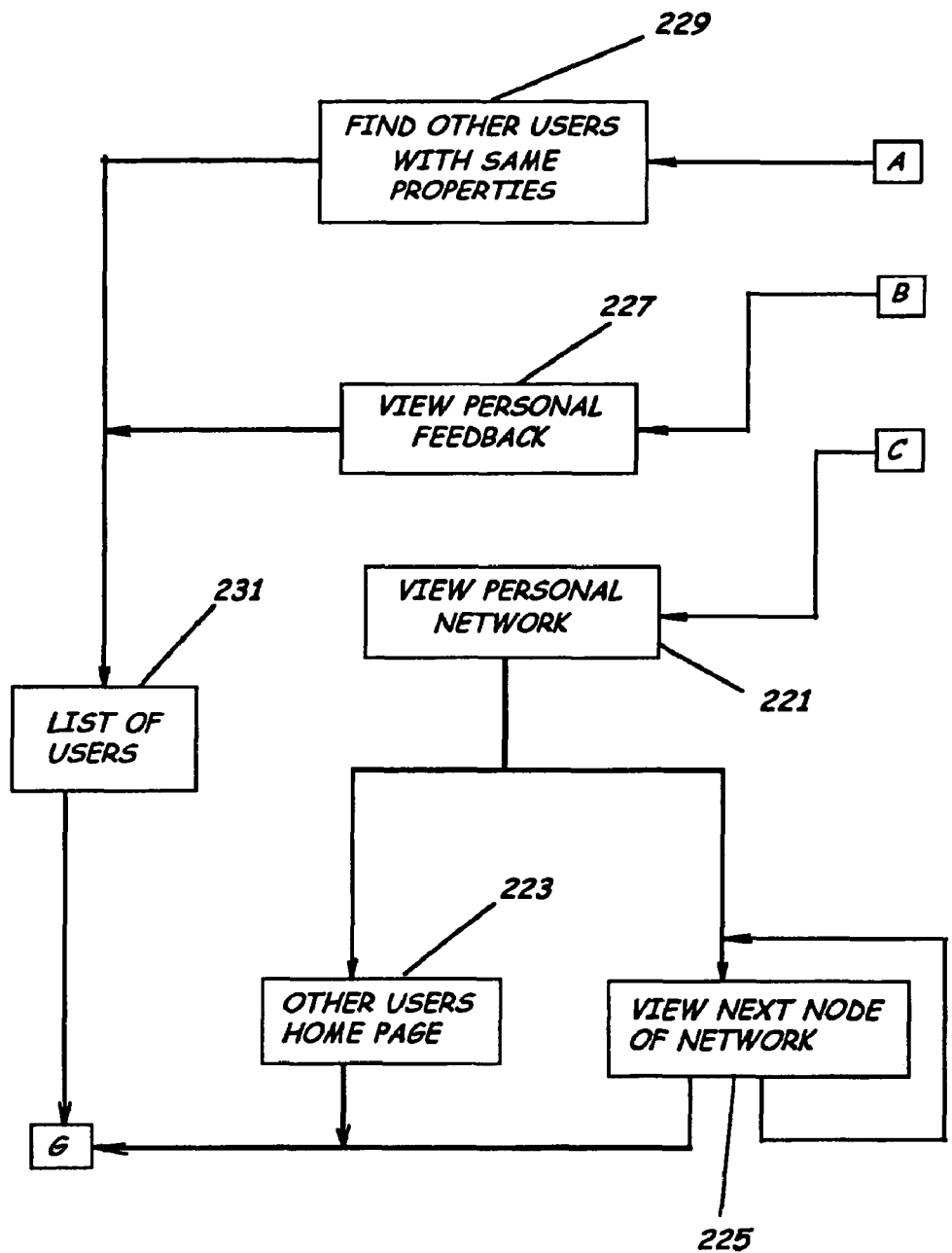
Figure 2C:
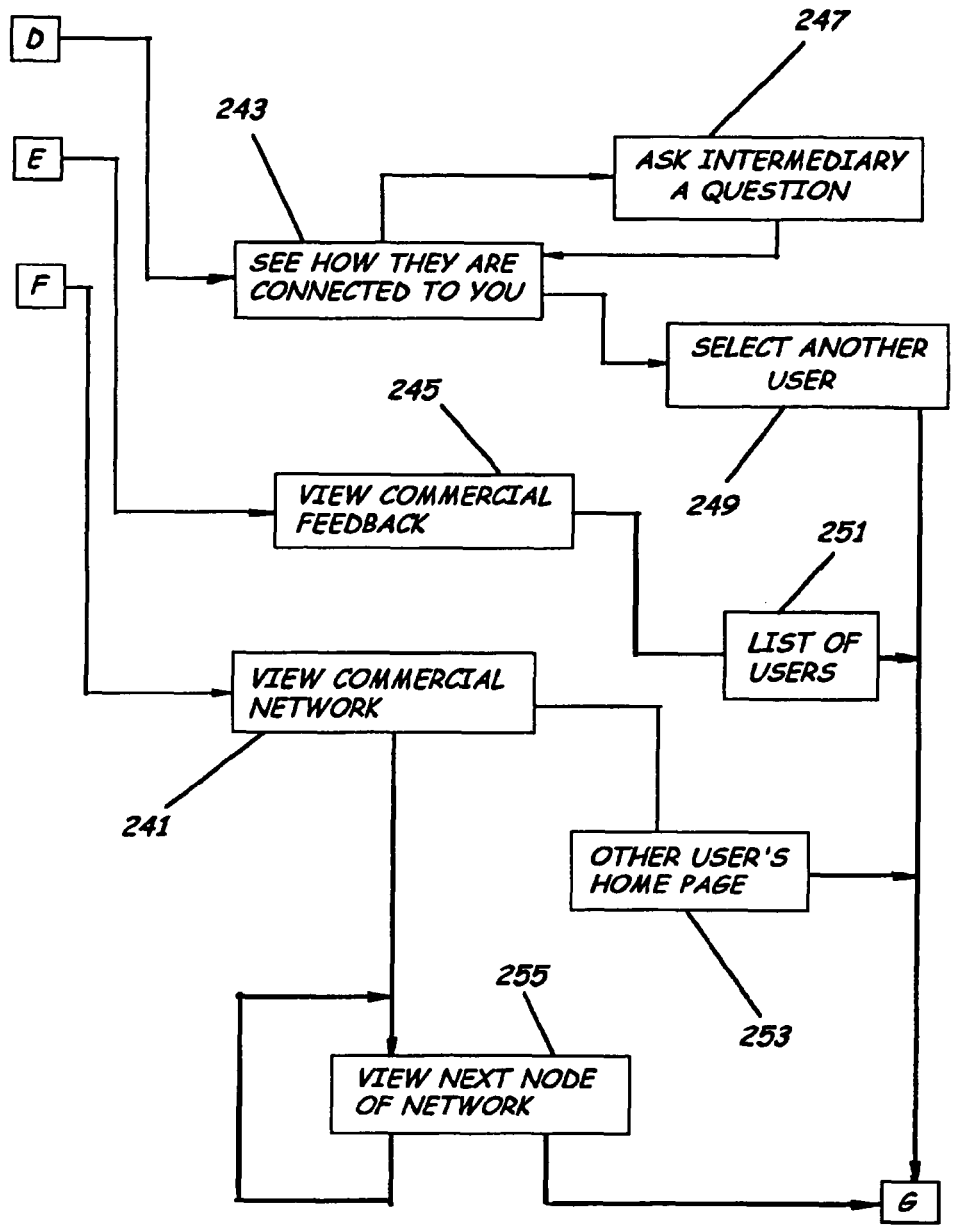

A similar page for the personal network 303 of each registered user displays the friends of that user, such as persons with whom the user has some relation, experience or affiliation, as shown at step 221 in FIG. 2B. Friends may be defined as people with whom a user has a personal, non-commercial relationship based on one or more non-commercial interactions. Each friend has associated as part of the personal network database his or her own user name and thumbnail image. Any user in the community may view any of another user's friend's profile (step 223) by simply clicking on a friend's image, name link, or the next node (step 225).

Thus, users within the community with whom a user communicates with or transacts business become part of either the user's personal or business network. However, if desired, in one embodiment (see FIG. 4), users must mutually agree as indicated schematically at 401 that they are in each other's network(s) by replying with a positive response to an invitation 403 or request to join. A negative response as shown schematically at 405 to the invitation as indicated at 403 does not consummate a network relationship.

For example, a first user within the community invites as shown at 403 (also step 213 in FIG. 2A) a second user within the community to join either the first user's personal network 303 (FIG. 3) or the first user's business network 301 so that the first user can leverage the personal and business relationships of the second user, or just meet new people with similar interests (step 229 in FIG. 2B) by viewing user lists 231 from database 47. If the second user accepts as shown at 401, a confirmation as indicated at 407 is sent at least to the invited second user (or both) of association with the first user that invited the second user. Both the first user and the invited second user are then members of one another's joined personal network or business network responsive to receipt of the confirmation as shown schematically at 407. If an invited user is not already registered in the community, the invited user is allowed to register and participate in the community as described above.

In addition, users may from their computer 53 browse data in database 47 and use the community of other users' personal and business networks (FIGS. 5 and 7) to organize and participate in many different types of activities and transactions. For example, a user may organize an on-line auction. A page constructed in accordance with the present invention summarizes and displays the auction interactions, such as items that the user is: watching and bidding on; items the user has won or not won; and items the user is selling, sold, and not sold, and pending items. Each page also has a "browse button" that allows users to browse with their computers 53 through various categories, and an "advanced search" feature that gives users the ability to narrow their search (see, e.g., FIGS. 15 and 16). The business network 301 also allows users to create listings for products or services in database 47 which they wish to sell or buy (steps 215, 217, respectively, in FIG. 2A), or to view such sales at step 218, and to allow users to interface at step 219. Users may perform browse step 216 and search step 220 from their computers 53 for a list of such sales resulting from sales step 218 at will.

Figure 6:
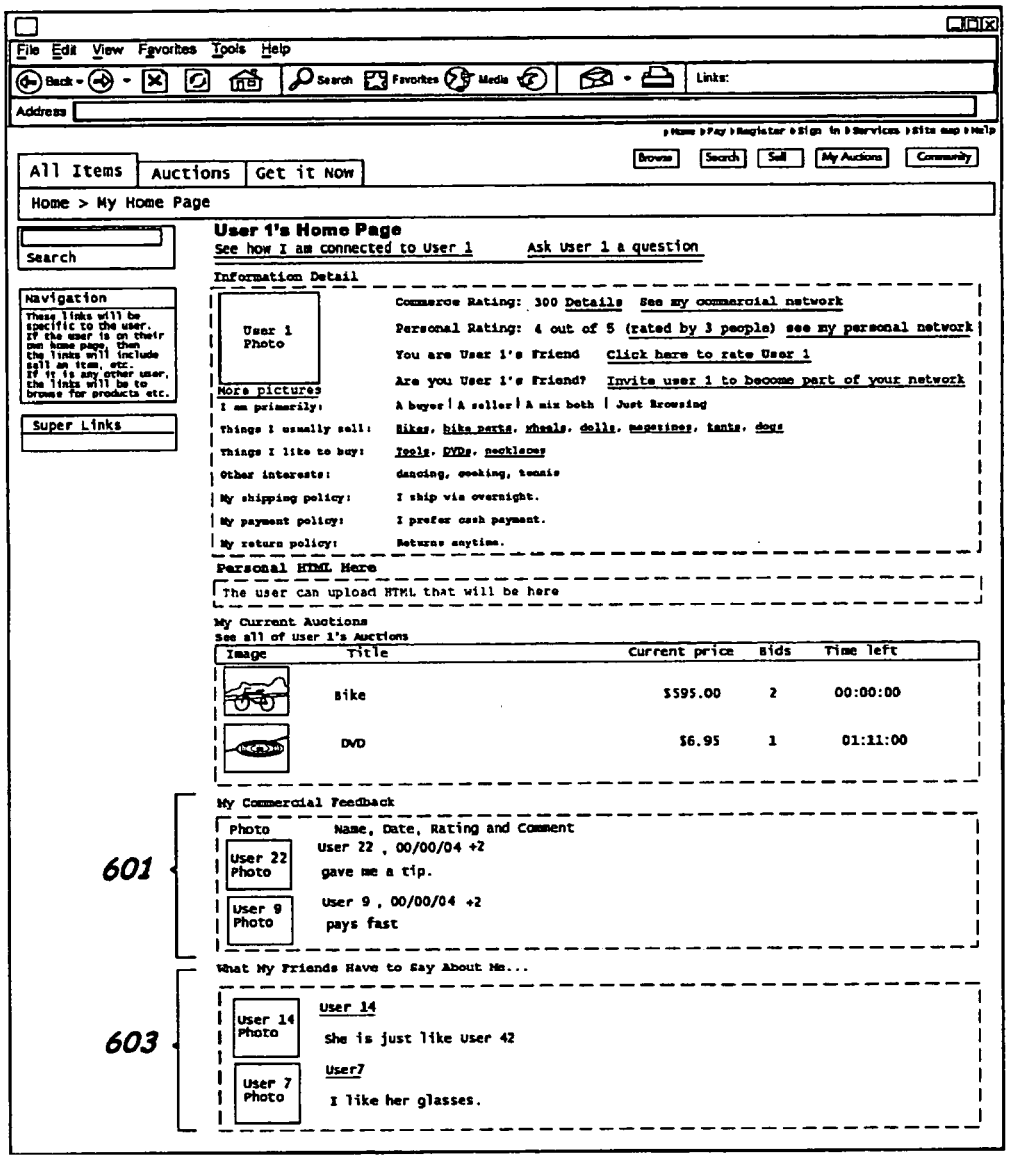
FIG. 6 is a schematic representation of a webpage for the personal and business e-commerce networks of FIG. 5, and is constructed in accordance with the present invention.
Figure 7:
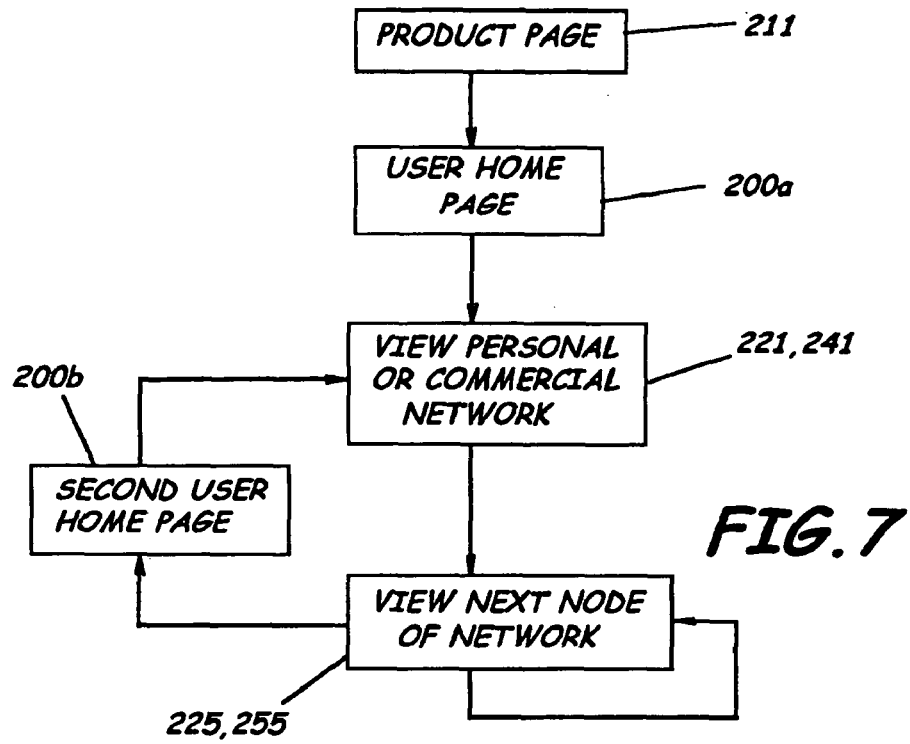
FIG. 7 is a high level logical flowchart of one embodiment of a process for browsing the personal and business e-commerce networks of FIGS. 5 and 6, and is constructed in accordance with the present invention.
Figure 8:
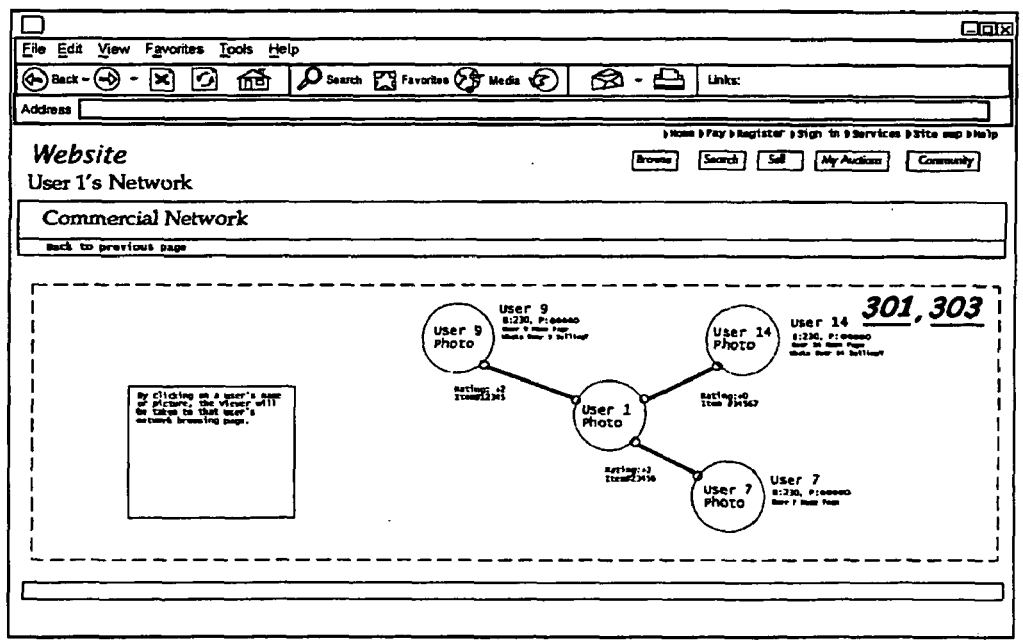
FIG. 8 is a schematic representation of a webpage for the browsing process of FIG. 7, and is constructed in accordance with the present invention.

The method of the present invention also permits a user to make ratings of those in the user's networks. For example, business ratings (step 245 of FIG. 2C) of electronic commerce with other users step indicated at 251 within the community are made and entered in database 47 thus are viewable (as shown in FIG. 8) for the business network, and personal ratings (step 227 of FIG. 2B) of personal, non-commercial electronic interactions with other users within the community are made and entered in database 47 for the personal network (as shown in FIG. 6). In one embodiment (FIGS. 6 and 8) of pages, each of the business ratings 601 and personal ratings 603 comprises both qualitative assessments responsive to textual or graphic comments for describing users within the respective business network and personal network, and quantitative assessments responsive to a relative scale for comparing users within the respective business network and personal network.

For example, users that buy goods or services (i.e., buyers) are encouraged to rate the users they purchased from (i.e., sellers). In one embodiment, buyers may rate their sellers by assigning an integer rating from, for example, −2 to +2, a positive feedback percentage, etc., and by entering comments into a free form text field. Commerce ratings may accumulate on a rolling interval of interest, such as a 12-month basis, and include options to view past ratings in a variety of formats (e.g., monthly, etc.). A user must buy from a seller in order to be able to rate the seller, and must be logged in to submit a rating. A buyer will be given a limited period of time (e.g., 90 days) from the date of purchase to submit a rating and/or comments, and the comments are not screened.

In their personal networks, users rate each personal interaction based on a relative scale (e.g., some suitable number of stars on a 0 to 5 star scale). Additionally, users may insert comments about people they rate. Users may rate one another as many times and as often as desired, but multiple comments preferably do not overwrite previously written comments. However, in one embodiment, each user must set up a profile to give another user a personal rating. In addition, a user must be another user's friend (e.g., mutually accepted acknowledgement) to give them a personal rating. In one embodiment, each user also has a personal testimonial page that displays feedback (e.g., ratings and comments) from his or her friends.

Another component of the present invention is sharing the business network, the business ratings, the personal network, and the personal ratings among the plurality of users within the community. For example, a third party user may browse another user's personal network and business network. If the third party user is registered in the community, and the third party user and the other user share at least one other user that is in at least one of both the third party user's and said another user's networks, then the third party user is allowed certain capabilities. For example, the third party user is permitted to see users within the community that link the third party user and the other user, thereby indicating to the third party user how the third party user is connected to the other user.

In one embodiment, links are provided for graphically illustrating a user's networks to users within the community. Selecting one of the users responsively displays the personal and business networks, the ratings, and links to either products or services being offered for sale of the selected one of the users so that a user can browse the networks of interconnected users. In addition, the present invention comprises organizing and/or participating in exchanges, such as business transactions or personal events. The exchanges are formed by selecting users from other users' respective business or personal networks within the community.

Figure 11:
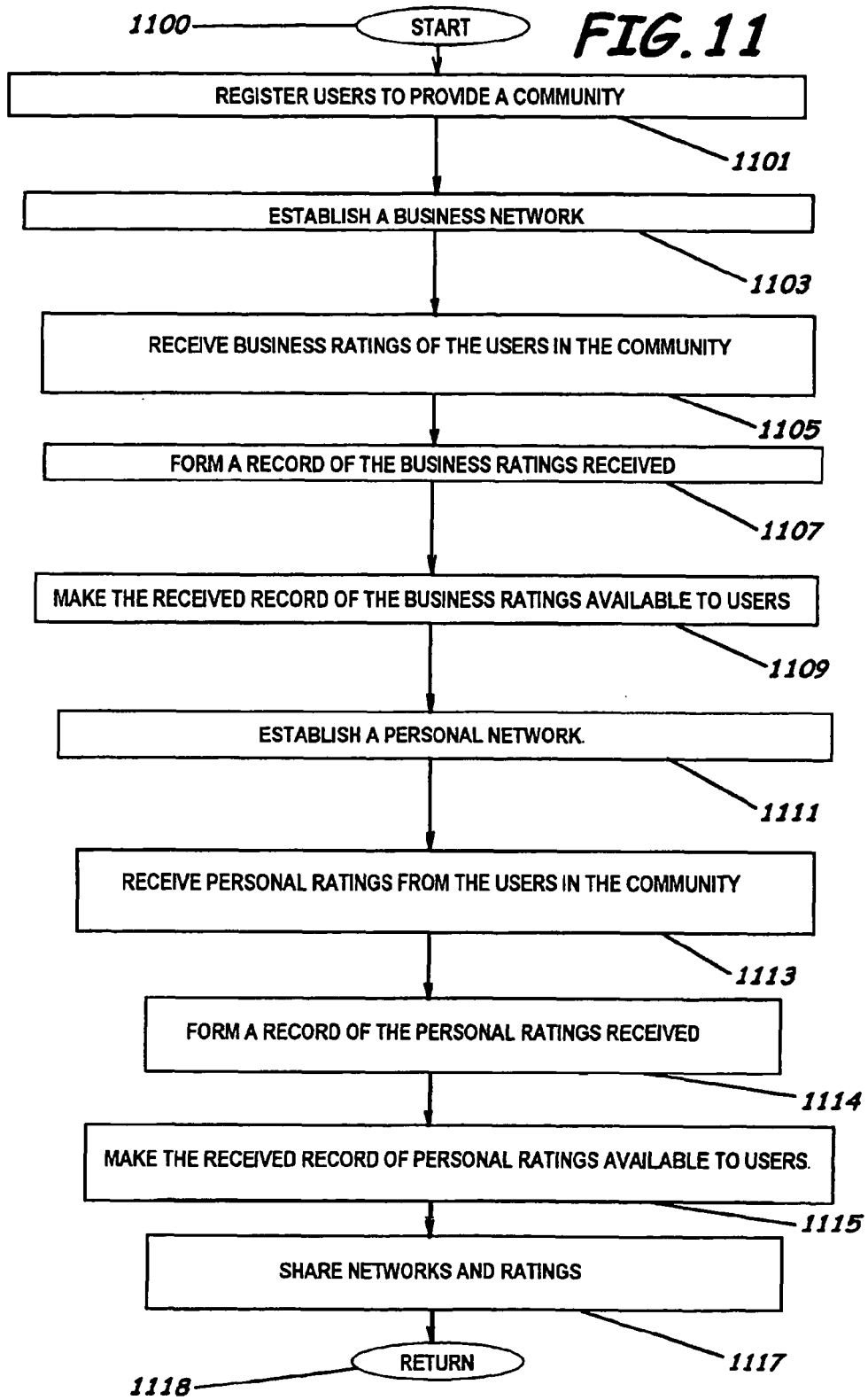
FIGS. 11-13 are block diagrams of one embodiment of a computer-implemented method constructed in accordance with the present invention.
Figure 12:
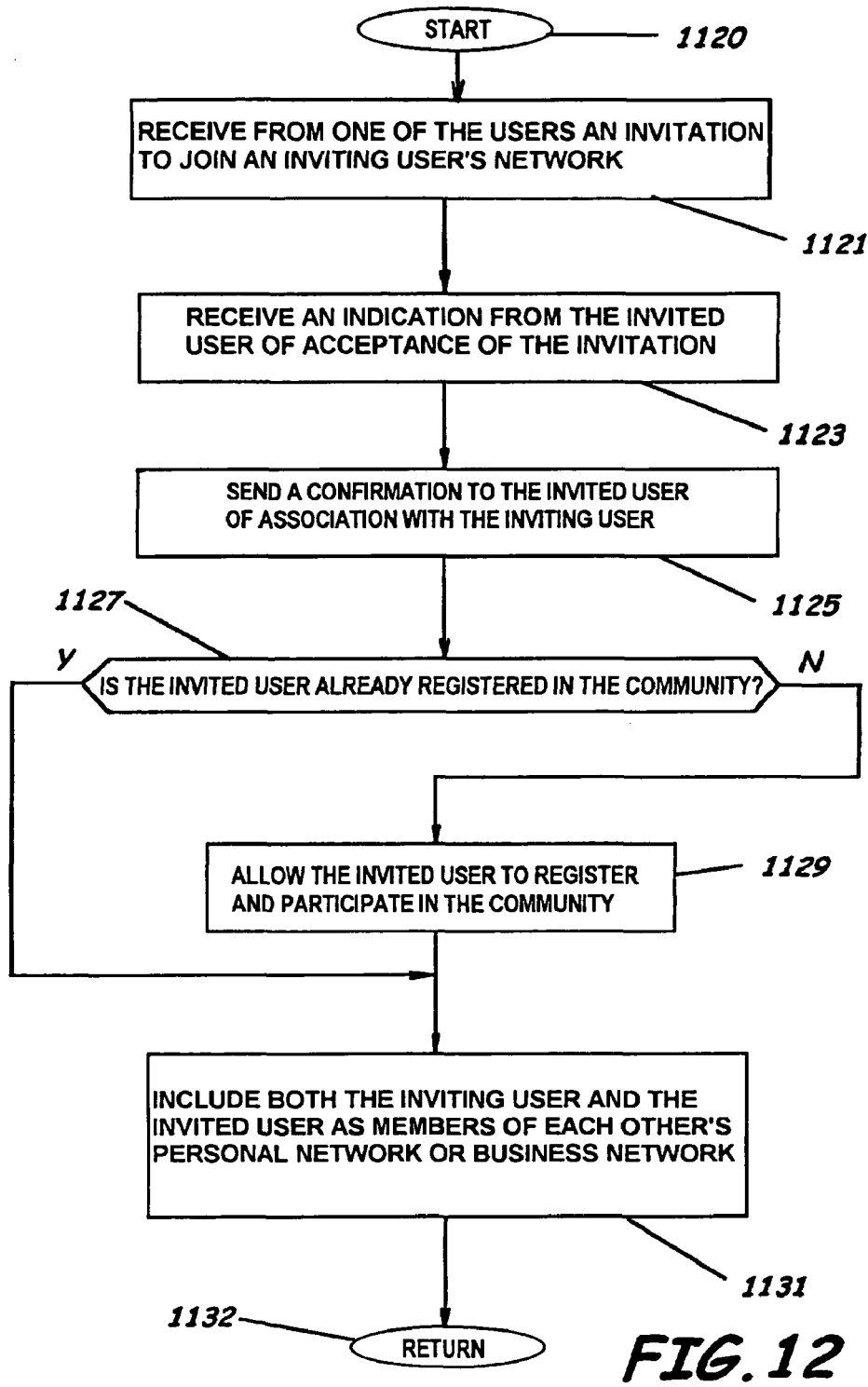
Figure 13:
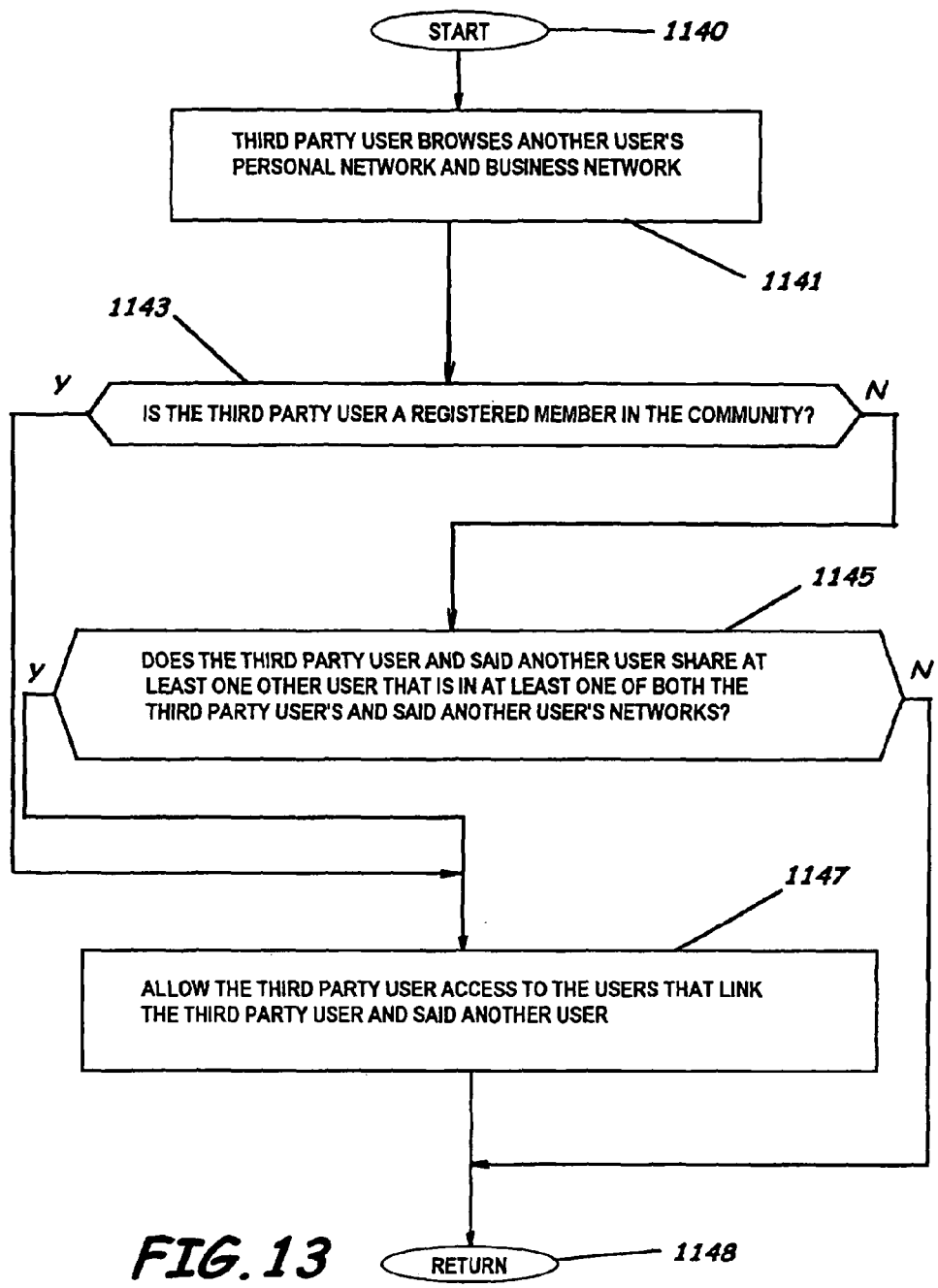

Referring now to FIGS. 11-13, one embodiment of a computer-implemented method with the computer system 30 of facilitating electronic commerce over a publicly accessible computer network is shown. The computer-implemented method is shown as a sequence of steps which are, however typically performed on a multitasking basis. The method starts at step 1100 and progresses to a step of registering users (such as shown at step 1101) on the computer system 30 at database 47 to provide a community of electronically interconnected users. This results, as discussed above, in a community of user computers as shown in FIGS. 3 and 4. As illustrated at step 1103, a business network of business relationships as shown schematically at 301 for the community of electronically interconnected users is established at the computer system 30 in the database 47 based on electronic commerce transactions through the computer system 30 with other users of the community. Business ratings of the users in the community of electronically interconnected users are received at the computer server 31, as depicted at step 1105. The computer-implemented method forms a record and stores in database 47 the business ratings received from the users of the community of electronically interconnected users (step 1107). The received and stored record of the business ratings available is made available to the users of the community of electronically interconnected users on request from one of the users of the community of electronically interconnected users (step 1109).

As illustrated at step 1111, a personal network of personal relationships for the users of the community of electronically interconnected users is also established at the computer based on personal electronic interaction through the computer with other users of the community. Step 1113 results in the receiving at the computer server 31 personal ratings received from the users in the community of electronically interconnected users, which are stored in database 47 as illustrated at step 1114. The received and stored record of personal ratings in database 47 is thus available at step 1115 to the users of the community of electronically interconnected users on request from one of the users in the community of electronically interconnected users. Finally, as shown at step 1117, information concerning the established personal networks, personal ratings, business networks, and business ratings of the users of the community of electronically interconnected users in the database 47 is shared from the computer over the publicly accessible computer network, before a return step 1118.

As shown in FIG. 12, after starting at step 1120, one embodiment of the computer-implemented method may further comprise receiving at the computer server 31 from one of the users 53 of the community of electronically interconnected users an invitation to another user to join one or both of the inviting user's personal network and business network (step 1121). The computer server 31 is thus able to receive an indication from the invited user of acceptance of the invitation (as shown at step 1123). In the event of such an acceptance, the computer server 31 sends a confirmation to the invited user of association with the inviting user (as shown at step 1125). If the invited user is not already registered in the community (as shown at step 1127), the invited user is allowed to register in the system 30 and its database 47 and participate in the community (as shown at step 1129). The computer-implemented method may further include the step of including both the inviting user and the invited user as members of each other's personal network or business network in the database 47 in response to a step 1131 of sending a confirmation, before returning as shown at step 1132.

Referring now to FIG. 14, after starting at step 1140, the computer-implemented method may further comprise a step of a third party user browsing another user's personal network and business network (as shown at step 1141) and, if the third party user is a registered member in the community (as shown at step 1143). Further, if the third party user and the other user share at least one other user that is in database 47 as belonging to at least one of both the third party user's and the other user's business or personal networks (as shown at step 1145), the third party user is allowed access to the users that link the third party user and the other user. In such a case, the third party user is sent data from database 47 to illustrate to the third party user how the third party user is connected to said another user (step 1147), and a return step occurs as shown at step 1148.

The present invention has several advantages, including the ability to enable Internet commerce via personal and commercial community connections. The present invention is facilitated and aided by leveraging the personal and business connections of the parties involved, and allows participants to form networks by invitation and mutual acceptance. Users also can explore the connections between themselves and other buyers/sellers, themselves and their friends, or some combination of buyers/sellers and friends in order to find items to buy. Exploring users is inextricably linked to searching for products. Moreover, this model can be implemented on any consumer-to-consumer, business-to-business, or business-to-consumer Internet site.

Other advantages include recordation of the details of every transaction in a database regardless of its type. Significantly, each party participating in the transaction rates each transaction to form relationships between the parties. Each user also is able to create personal relationships with other users they are acquainted with, even if they have not engaged in a business transaction.

Furthermore, various computer systems link each user's networks to other networks. As the systems link networks together, that data is stored in a database. Thus, users who have performed transactions or created personal relationships are linked to users on Internet commerce sites. These systems allow users to view not only their immediate network but also their extended network, which is particularly important when users are attempting to complete business transactions. Each party involved in the transaction is able to see how their network links to the other party via other users, which helps facilitate business transactions.

While the invention has been shown or described in only some of its forms, it should be apparent to those skilled in the art that it is not so limited, but is susceptible to various changes without departing from the scope of the invention.

What is claimed is:

1. A method of facilitating electronic commerce, the method comprising:

processing with a server module registering registrations for a plurality of users on a website of a communications network, said communications network having a computer system connected thereto for hosting said website, said computer system having at least one computer defining the server module, said server module being connected to a data storage medium, each of the plurality of users being electronically interconnected so that the plurality of users define a community of users;

receiving and processing with the server module listing information for products or services for sale from users in the community at the computer system over the communications network and storing the listing information in the data storage medium;

providing with the server module the listing information for the products or services for sale from the data storage medium to other users in the community upon request over the communications network;

processing with the server module electronic commerce between users in the community over the communications network, said electronic commerce including business transactions involving the products or services identified in the listing information stored in the data storage medium;

processing with the server module, for each user in the community of users, a business network of business relationships based upon (i) the electronic commerce with other users in the community conducted through the computer system such that the only users included in a user's business network are those other users with whom the user has either sold to, purchased from, or both, and (ii) mutual agreement between the user and those other users to join each other's business network;

electronically storing, for each user in the community of users, the business network of business relationships in the data storage medium;

processing with the server module business ratings of electronic commerce with other users within the community and storing said business ratings in the data storage medium;

processing with the server module personal, non-commercial electronic interaction between users in the community through the computer system;

processing with the server module, for each user in the community of users, a personal network of personal relationships based upon (i) the personal, non-commercial electronic interaction with other users conducted through the computer system, and (ii) mutual agreement between the user and those other users to join each other's personal network;

electronically storing, for each user in the community of users, the personal network of personal relationships in the data storage medium;

processing with the server module personal ratings of personal, non-commercial electronic interactions with other users within the community and storing said personal ratings in the data storage medium;

displaying on a computer of a third party user (i) thumbnail images, profile names, and links to homepages of users in the community belonging to a selected user's business network, (ii) thumbnail images, profile names, and links to homepages of users in the community belonging to the selected user's personal network (iii) the business and personal ratings of the selected user, (iv) any connection between the third party user and the selected user in their personal or business networks, and (v) listing information for products or services offered for sale by the selected user on the computer system; and processing with the server module a business transaction between the third party user and the selected user, the business transaction involving buying or selling of a product or service identified in the listing information stored in the data storage medium by the selected user.

2. A method as defined in claim 1, wherein each of the business ratings and personal ratings comprises both qualitative assessments responsive to textual or graphic comments for describing users within the respective business network and personal network, and quantitative assessments responsive to a relative sale for comparing users within the respective business network and personal network.

3. A method as defined in claim 1, further comprising a first user within the community inviting a second user within the community to join either the first user's personal network or the first user's business network so that the first user can leverage the personal and business relationships of the second user, and sending a confirmation to the invited second user of association with the first user that invited the second user.

4. A method as defined in claim 3, wherein, if an invited user is not already registered in the community, allowing the invited user to register and participate in the community.

5. A method as defined in claim 3, wherein both the first user and the invited second user are members of one another's joined personal network or business network responsive to receipt of the confirmation.

6. A method as defined in claim 1, wherein at least some users within the community with whom a user communicates with or transacts business become part of either the users' personal or business network, and wherein the electronic commerce comprises at least one of buying goods, selling goods, buying services, or selling services.

7. A method as defined in claim 1, further comprising users either performing keyword searches or browsing taxonomy of other users' networks within the community to locate either products or services in which the users are interested in electronic commerce.

8. A method as defined in claim 1, further comprising the third party user browsing the selected user's personal network and business network and, if the third party user is registered in the community, and the third party user and said selected user share at least one other user that is in at least one of both the third party user's and said selected user's networks, then allowing the third party user to see at least one of the users within the community that link the third party user and said selected user, thereby indicating to the third party user how the third party user is connected to said selected user.

9. A method as defined in claim 8, further comprising graphically illustrating and providing links to each of said at least one of the users within the community to the third party user.

10. A method as defined in claim 8, wherein selecting one of said at least one of the users responsively displays the personal and business networks, the ratings, and links to either products or services being offered for sale of the selected one of said at least one of the users so that a user can browse the networks of interconnected users.

11. A method as defined in claim 1, further comprising organizing either business transactions or personal events that are formed by selecting users from other users' respective business or personal networks within the community.

12. A method as defined in claim 1, further comprising participating in either business transactions or personal events that are formed by selecting users from other users' respective business or personal networks within the community.

13. A method as defined in claim 1, further comprising:
displaying product webpages featuring the products or services listed for sale by selling users in the community to potential buying users in the community;
automatically solving the degrees of separation between potential buying users and selling users; and
providing a graphical display of the degrees of separation between the potential buying users and the selling users to the potential buying users.

14. A computer-implemented method of facilitating electronic commerce over a publicly accessible computer network, comprising the steps of:
processing with a server module registrations for users to provide a community of electronically interconnected users, said storage medium being accessible to at least one computer defining the server module, said server module being part of a computer system connected to the publicly accessible computer network;
receiving and processing with the server module listing information for products or services for sale from users in the community at the computer system over the communications network and storing the listing information in the storage medium;
providing with the server module the listing information for the products or services for sale from the storage medium to other users in the community upon request over the communications network;
processing with the server module electronic commerce transactions between users in the community over the communications network, said electronic commerce transactions including business transactions involving the products or services identified in the listing information stored in the storage medium;
processing with the server module a business network of business relationships for the community of electronically interconnected users based on (i) electronic commerce transactions with other users in the community conducted through the computer system such that the only users included in a user's business network are those other users with whom the user has either sold to, purchased from, or both, and (ii) mutual agreement between the user and those other users to join each other's business network;
processing with the server module business ratings of the users in the community of electronically interconnected users;
forming a record in the storage medium of the business ratings received from the users of the community of electronically interconnected users;
making the business ratings in the storage medium available to the users of the community of electronically interconnected users on request from one of the users of the community of electronically interconnected users;
processing with the server module personal electronic interaction between users in the community through the computer system;
processing with the server module a personal network of personal relationships for the users of the community of electronically interconnected users based on the personal electronic interaction through the computer system with other users of the community;
processing with the server module personal ratings received from the users in the community of electronically interconnected users;
making the personal ratings in the storage medium available to the users of the community of electronically interconnected users on request from one of the users of the community of electronically interconnected users; and
displaying on a computer of a third party user (i) thumbnail images, profile names, and links to homepages of users in the community belonging to a selected user's business network, (ii) thumbnail images, profile names, and links to homepages of users in the community belonging to the selected user's personal network (iii) the business and personal ratings of the selected user, (iv) any connection between the third party user and the selected user in their personal or business networks, and (v) listing information for products or services offered for sale by the selected user on the computer system.

15. The method of claim 14, wherein the personal ratings and business ratings comprise qualitative assessments based on comments describing users and quantitative assessments based on a relative scale for comparing users.

16. The method of claim 14, further including the steps of receiving at the computer system from one of the users of the community of electronically interconnected users to another user of the Internet an invitation to join one or both of the inviting user's personal network and business network;
receiving at the computer system an indication from the invited user acceptance of the invitation;
and
sending from the computer system a confirmation to the invited user of association with the inviting user.

17. The method of claim 16, wherein the invited user is not already registered in the community and further including the step of allowing the invited user to register and participate in the community.

18. The method of claim 16, further including the step of including both the inviting user and the invited user as members of each other's personal network or business network in response to the step of sending a confirmation.

19. The method of claim 14, wherein the users with whom a user member of the community of electronically interconnected users communicates with and transacts business become part of one or both of the users' personal or business network.

20. The method of claim 14, further including the step of permitting users to perform searches of other users' networks to find products or services in which the users are interested in viewing or buying.

21. The method of claim 20 wherein the searches comprise keyword searches.

22. The method of claim 20 wherein the searches comprise browsing taxonomy.

23. The method of claim 14, further wherein a third party user browses another user's personal network and business network and, if the third party user is a registered member in the community, and the third party user and said another user share at least one other user that is in at least one of both the third party user's and said another user's networks, then allowing the third party user access to the users that link the third party user and said another user, thereby illustrating to the third party user how the third party user is connected to said another user.

24. The method of claim 14, further comprising illustrating records received from the computer system and providing links to the community to the third party user.

25. The method of claim 14, wherein selecting one of the users displays the personal and business networks, the ratings, and links to products or services being sold by such one of the users, such that a user can browse the networks of interconnected users.

26. The method of claim 14, further comprising organizing or participating in business transactions or personal events that are formed by selecting users from other users' networks.

27. A system to facilitate e-commerce over a publicly accessible computer network, comprising:
- a first computer at a site accessible to the computer network to define a server, the first computer having a processor, memory coupled to the processor to store operating instructions therein, a graphical display coupled to the processor for displaying graphical images;
- a database accessible to the processor of the server and containing database records about e-commerce and the community of electronically interconnected users;
- a set of machine-readable instructions stored in the memory of the server to cause the server to form a community of electronically interconnected users of the computer network to facilitate e-commerce;
- a user interface coupled to the processor of the first computer to provide user access to manipulate the software and access database records;
- said user interface allowing users to provide listing information for products or services for sale that is stored in the database;
- said user interface further allowing users to browse the listing information for products or services for sale stored in the database upon request;
- said user interface further allowing users to engage in electronic commerce through the server, said electronic commerce including business transactions for the products or services identified in the listing information stored in the database;
- a second computer at a user site accessible to the computer network, the second computer defining a first user and having a processor, memory coupled to the processor to store software therein, and to receive database records therein, a graphical display coupled to the processor for displaying graphical images, and a user interface coupled to the processor to provide a user access to manipulate the stored software and received database records;
- a third computer positioned at another user site accessible to the computer network, the third computer defining a second user and having a processor, memory coupled to the processor to store software therein and to receive database records therein, a graphical display coupled to the processor for displaying graphical images, and a user interface coupled to the processor to provide a user access to manipulate the software and received database records;
- the first user computer and the second user computer being interconnected through the server to the publicly accessible computer network to establish business networks of business relationships for the community of electronically interconnected users based on the electronic commerce transactions through the server and based on mutual agreement between two users to join each others business networks, and to establish personal networks of personal, noncommercial relationships for the community of electronically interconnected users based on personal electronic interaction through the server;
- the first user and the second user generating business ratings of the users in the community based on commercial e-commerce transactions between the users, and generating personal ratings of the users in the community based on personal non-commercial interactions between the users;
- the database receiving and storing the business ratings and the personal rating generated by the users and making the stored ratings available to the users of the community such that information concerning the business networks, business ratings, personal networks, and personal ratings of the users of the community are shared between the users of the community; and
- displaying on the second computer (i) thumbnail images, profile names, and links to homepages of users in the community belonging to second user's business network, (ii) thumbnail images, profile names, and links to homepages of users in the community belonging to the second user's personal network (iii) the business and personal ratings of the second user, (iv) any connection between the first user and the second user in their personal or business networks, and (v) listing information for products or services offered for sale by the second user.

28. A system of claim 27, wherein each of the business ratings and personal ratings comprises both qualitative assessments responsive to textual or graphic comments for describing users within the respective business network and personal network, and quantitative assessments responsive to a relative scale for comparing users within the respective business network and personal network.

29. A system of claim 27, wherein the first user invites the second user to join either the first user's personal or business network so that the first user can leverage the personal and business relationships of the second user, and wherein the server sends a confirmation to the invited second user of association with the first user that invited the second user.

30. A system of claim 29, wherein both the first user and the invited second user are members of one another's joined personal or business network responsive to receipt of the confirmation.

31. A system of claim 27, wherein at least some users within the community with whom a user communicates with or transacts business become part of either the user's personal or business network, and wherein the electronic commerce comprises at least one of buying goods, selling goods, buying services, or selling services.

32. A system of claim 27, wherein the first and second users either perform keyword searches or browse taxonomy of other users' networks within the community to locate either products or services in which the users are interested in electronic commerce.

33. A system of claim 27, further comprising a third user browsing one of the first and second user's personal and business networks and, if the third user is registered in the community, and the third user and said one of the first and second user share at least one other user that is in at least one of both the third user's and said one of the first and second user's networks, then allowing the third user to see at least one of the users within the community that link the third user and said one of the first and second user, thereby indicating to the third user how the third user is connected to said one of the first and second user.

34. A system of claim 33, further comprising the server graphically illustrating and providing links to each of said at least one of the users within the community to the third user.

35. A system of claim 33, wherein selecting one of said at least one of the users responsively displays the personal and business networks, the ratings, and links to either products or services being offered for sale of the selected one of said at least one of the users so that a user can browse the networks of interconnected users.

36. A system of claim 27, further comprising organizing either business transactions or personal events that are formed by selecting users from other users' respective business or personal networks within the community.

37. A system of claim 27, further comprising participating in either business transactions or personal events that are formed by selecting users from other users' respective business or personal networks within the community.

38. A non-transitory computer readable medium that is readable by a computer facilitating electronic commerce in a publicly accessible computer network, the computer readable medium comprising:

a set of instructions that, when executed by the computer, cause the computer to perform the following operations: register users with the computer to provide a community of electronically interconnected users; receive product listing information for products or services for sale from users; provide the listing information to other users upon request; allow users to engage in electronic commerce through the computer, said electronic commerce including business transactions for the products or services identified in the listing information; establish at the computer a business network of business relationships for the community of electronically interconnected users based on the electronic commerce transactions through the computer with other users of the community and mutual agreement between two users to join each other's business networks; receive at the computer business ratings of the users in the community of electronically interconnected users; form a record of the business ratings received from the users of the community of electronically interconnected users; make the received record of the business ratings available to the users of the community of electronically interconnected users on request from one of the users of the community of electronically interconnected users; establish in the computer a personal network of personal relationships for the users of the community of electronically interconnected users based on personal electronic interaction through the computer with other users of the community; receive at the computer personal ratings received from the users in the community of electronically interconnected users; make the received record of personal ratings available to the users of the community of electronically interconnected users on request from one of the users of the community of electronically interconnected users; and display on a computer of a third party user: (i) thumbnail images, profile names, and links to homepages of users in the community belonging to a selected user's business network, (ii) thumbnail images, profile names, and links to homepages of users in the community belonging to the selected user's personal network (iii) the business and personal ratings of the selected user, (iv) any connection between the third party user and the selected user in their personal or business networks, and (v) listing information for products or services offered for sale by the selected user.

39. A computer system facilitating electronic commerce over a publicly accessible computer network, comprising:
a processor;
a storage medium having data accessible to the processor;
an input/output for transferring data to the processor;
the processor comprising:
means for registering users in the storage medium to provide a community of electronically interconnected users;
means for receiving listing information for products or services for sale from users in the community at the computer system over the communications network and storing the listing information in the storage medium;
means for providing the listing information for the products or services for sale from the storage medium to other users in the community upon request over the communications network;
means for allowing users in the community to conduct electronic commerce transactions with other users in the community over the communications network using the computer system, said electronic commerce transactions including business transactions involving the products or services identified in the listing information stored in the storage medium;
means for establishing in the storage medium a business network of business relationships for the community of electronically interconnected users based on the electronic commerce transactions through the computer with other users of the community;
means for receiving at the input/output business ratings of the users in the community of electronically interconnected users;
means for forming a record in the storage medium of the business ratings received from the users of the community of electronically interconnected users;
means for making the business ratings in the storage medium available to the users of the community of electronically interconnected users on request from one of the users of the community of electronically interconnected users;
means for establishing in the storage medium a personal network of personal relationships for the users of the community of electronically interconnected users based on personal electronic interaction through the computer with other users of the community;
means for receiving at the input/output personal ratings received from the users in the community of electronically interconnected users;
means for making the personal ratings in the storage medium available to the users of the community of electronically interconnected users on request from one of the users of the community of electronically interconnected users; and
means for displaying on a computer of a third party user (i) thumbnail images, profile names, and links to homepages of users in the community belonging to a selected user's business network, (ii) thumbnail images, profile names, and links to homepages of users in the community belonging to the selected user's personal network (iii) the business and personal ratings of the selected user, (iv) any connection between the third party user and the selected user in their personal or business networks, and (v) listing information for products or services offered for sale by the selected user on the computer system.

40. A method of facilitating electronic commerce, the method comprising:

processing with a server module registrations for a plurality of users on a website of a communications network, each of the plurality of users being electronically interconnected so that the plurality of users define a community of users;

receiving and processing with the server module listing information for products or services for sale from users in the community through the website;

providing the listing information for the products or services for sale to other users in the community upon request through the website;

processing with the server module electronic commerce between users in the community through the website for the products or services identified in the listing information;

processing with the server module a business network of business relationships for the community based on (i) electronic commerce with other users in the community conducted through the computer system such that the only users included in a user's business network are those other users with whom the user has either sold to, purchased from, or both, and (ii) mutual agreement between the user and those other users to join each other's business network;

processing with the server module a personal network of personal relationships for the community through personal, non-commercial electronic interaction between users;

displaying on a computer of a third party user (i) thumbnail images, profile names, and links to homepages of users in the community belonging to a selected user's business network, (ii) thumbnail images, profile names, and links to homepages of users in the community belonging to the selected user's personal network (iii) business and personal ratings of the selected user, (iv) any connection between the third party user and the selected user in their personal or business networks, and (v) listing information for products or services offered for sale by the selected user on the computer system; and sharing the business network and the personal network among the plurality of users within the community.

* * * * *